United States Patent
Seki et al.

(10) Patent No.: US 7,429,033 B2
(45) Date of Patent: Sep. 30, 2008

(54) SCAVENGING CARBURETOR

(75) Inventors: Harunori Seki, Katusika-Ku (JP);
Yoshiaki Douyama, Shiroishi (JP);
Toshimasa Takahashi, Shiroishi (JP)

(73) Assignee: Walbro Engine Management, L.L.C., Tucson, AZ (US)

( * ) Notice: Subject to any disclaimer, the term of this patent is extended or adjusted under 35 U.S.C. 154(b) by 231 days.

(21) Appl. No.: 11/293,954

(22) Filed: Dec. 5, 2005

(65) Prior Publication Data

US 2006/0125125 A1    Jun. 15, 2006

(30) Foreign Application Priority Data

| Dec. 10, 2004 | (JP) | ............................ 2004-357864 |
| Aug. 8, 2005 | (JP) | ............................ 2005-229109 |
| Aug. 10, 2005 | (JP) | ............................ 2005-232120 |
| Aug. 25, 2005 | (JP) | ............................ 2005-244352 |

(51) Int. Cl.
*F02M 23/03* (2006.01)

(52) U.S. Cl. ...................... 261/45; 123/73 PP; 261/47; 261/63; 261/DIG. 1

(58) Field of Classification Search ................. 261/23.2, 261/23.3, 45–47, 63, DIG. 1; 123/73 PP
See application file for complete search history.

(56) References Cited

U.S. PATENT DOCUMENTS

| 6,418,891 | B2 * | 7/2002 | Kobayashi | .............. | 123/73 PP |
| 6,564,761 | B2 * | 5/2003 | Uenoyama et al. | ....... | 123/73 PP |
| 6,662,767 | B1 * | 12/2003 | Nonaka | ..................... | 123/73 A |
| 6,708,958 | B1 | 3/2004 | Warfel et al. | | |
| 2002/0139326 | A1 * | 10/2002 | Araki | ..................... | 123/73 PP |
| 2004/0130039 | A1 * | 7/2004 | Suzuki et al. | .............. | 261/23.2 |
| 2004/0251564 | A1 * | 12/2004 | Mavinahally | .............. | 261/23.3 |

* cited by examiner

*Primary Examiner*—Richard L Chiesa
(74) *Attorney, Agent, or Firm*—Reising, Ethington, Barnes, Kisselle, P.C.

(57) ABSTRACT

A scavenging carburetor having an improved relationship between scavenging air flow and fuel-and-air flow to an engine over its range of operating conditions. The carburetor has a butterfly throttle valve and a plug-type scavenging valve. Levers are attached to support shafts of the valves and are connected to each other by a connecting rod so as to synchronize movement of the valves. Because of the different opening angle versus open area properties of the two valves, the supply of the scavenging air is minimized over a low speed range of the engine so as to achieve a stable low speed operation and a stable acceleration from idle conditions and a relatively large amount of scavenging air is supplied over a high speed range of the engine for the given amount of fuel-and-air mixture that is supplied. Therefore, the fuel-and-air mixture supply and scavenging air supply is better matched to the requirements of a particular engine than was possible with conventional combinations of valves.

26 Claims, 32 Drawing Sheets

SCAVENGING CARBURETOR

CROSS-REFERENCE TO RELATED APPLICATION

Applicants claim priority of Japanese Application, Ser. No. 2004-357864, filed Dec. 10, 2004; Japanese Application, Ser. No. 2005-229109, filed Aug. 8, 2005; Japanese Application, Ser. No. 2005-232120, filed Aug. 10, 2005; and Japanese Application, Ser. No. 2005-244352, filed Aug. 25, 2005.

FIELD OF THE INVENTION

The present invention relates generally to carburetors and more particularly to stratified scavenging carburetors for controlling delivery of a fuel-and-air mixture and scavenging air to an engine.

BACKGROUND OF THE INVENTION

In general, carburetors are useful for small two-stroke internal combustion engines commonly used in hand held power tools such as chain saws, weed trimmers, leaf blowers, and the like. Carburetors control engine power by metering and mixing liquid fuel with air to adjust a fuel-to-air ratio and quantity according to varying engine requirements during startup, idle, steady-state operation, and for changes in load and altitude.

In particular, a scavenging carburetor is known to have a fuel-and-air mixture passage and a separate scavenging air passage that both communicate at one end of the carburetor with a clean air source at atmospheric pressure, such as air filter. At an opposite end of the carburetor, the fuel-and-air mixture passage and the separate scavenging air passage communicate with an engine crankcase and an engine combustion chamber, respectively. A butterfly throttle valve is disposed within the fuel-and-air mixture passage and a butterfly air control valve is disposed within the scavenging air passage.

To ensure stability of engine operation at idle and over a relatively low speed range, and ensure prompt acceleration from low to high engine speed, it is known to prevent the supply of scavenging air over a small angle range of increased opening of the throttle valve from its idle position. This delay in the opening of the scavenging valve enables a relatively rich fuel-and-air mixture to be supplied to the engine for stable combustion at idle and initial acceleration from idle. In other words, upon initial acceleration of the engine, the throttle valve opens to provide an enriched fuel-and-air mixture to the engine and, toward the end of initial acceleration, or shortly thereafter, the scavenging valve starts to open to permit clean air to flow by the scavenging valve for scavenging exhaust gases from the combustion chamber. This valve opening sequence thereby provides a relatively leaner mixture of fuel-and-air in the combustion chamber of the running engine after initial acceleration from the operating condition.

During steady state running of the engine at relatively higher speeds, the scavenging valve is open to supply a relatively large amount of scavenging air to the combustion chamber. This prevents the fuel mixture from blowing through the exhaust port of the engine, thereby reducing hydrocarbon exhaust emissions from the engine.

To meet different engine idling and high speed valve opening requirements, it is known to provide a lost-motion mechanism between a butterfly throttle valve and a butterfly scavenging valve to achieve delayed opening of the scavenging valve and synchronization between the throttle valve and scavenging valve. It is thereby possible to prevent the supply of the scavenging air until the opening angle of the throttle valve increases to a certain extent in a small opening angle range from idling by opening the scavenging valve only after the throttle valve has opened to a certain extent by using the lost motion mechanism.

Using conventional butterfly valve constructions and configurations, it is possible to prevent flow of scavenging air over a low speed range of the engine to achieve stable idle and low speed operation and stable initial acceleration, but there remains a problem during high speed operation. Specifically, over a high speed range of the engine, use of the butterfly-type scavenging valve does not enable a relatively large rate of change of the opening area of the butterfly-type scavenging valve compared to a relatively small rate of change of the opening area of the butterfly throttle valve. In short, conventional carburetor valve arrangements do not allow a favorable relationship between the opening areas of the throttle valve and scavenging valve to be achieved so as to meet different needs of a scavenged internal combustion engine operating at different speed and load conditions.

SUMMARY OF THE INVENTION

A scavenging carburetor with an improved relationship between opening properties of a throttle valve and a scavenging valve. The throttle valve includes a butterfly valve that opens and closes a fuel-and-air mixture passage, and the scavenging valve includes a plug-type valve that opens and closes a scavenging air passage. The scavenging carburetor also includes a synchronizing mechanism provided between the throttle valve and scavenging valve to properly synchronize opening and closing of the two valves.

According to a preferred aspect, an axis of rotation of a support shaft of the butterfly throttle valve extends parallel to an axis of rotation of the plug-type scavenging valve, wherein the valves can be operated smoothly, for instance by using the synchronizing mechanism for connecting the valves. According to another preferred aspect, the scavenging valve may be adapted to start opening the scavenging air passage after the scavenging valve has rotated through a prescribed angle in a fully closed position, so as to essentially totally prevent the supply of scavenging air over a small opening angle range from idle of the throttle valve.

In another form the carburetor includes a fuel-and-air mixture passage with a butterfly throttle valve that opens and closes the mixture passage and a throttle valve shaft supporting the throttle valve. The carburetor further includes a separate scavenging air passage and a scavenging valve including a plug-type valve that opens and closes the scavenging air passage, and a scavenging valve shaft supporting the scavenging valve. An adjustable synchronizing mechanism is provided between the throttle valve and the scavenging valve to open and close the valves in synchronism.

In a further form the scavenging carburetor includes a fuel-and-air mixture passage, a throttle valve including a butterfly valve that opens and closes the mixture passage, a scavenging air passage, and a scavenging valve including a plug-type valve that opens and closes the scavenging air passage. The scavenging air valve includes a rotary valve including a cylindrical support hole formed in a main body of the carburetor so as to extend across the scavenging air passage, and a cylindrical valve member coaxially and rotatably supported in the support hole and a through hole passing diametrically through the valve member. The cylindrical valve member is axially movable in the support hole so that a degree of communication between the air passage and the through hole in a fully open state of the valve may be adjusted. An adjustment device is provided to allow the cylindrical valve member to be axially positioned in the support hole at a desired position.

In yet another form, the scavenging carburetor includes a fuel-and-air mixture passage, a throttle valve including a butterfly valve that opens and closes the mixture passage, a scavenging air passage, and a scavenging valve including a plug-type valve that opens and closes the scavenging air passage. The scavenging valve includes a valve member formed with a through hole extending laterally across the valve member and having a cross section elongated in an axial direction of the valve member.

At least some of the objects, features and advantages that may be achieved by at least certain forms or embodiments of the invention include providing a carburetor that delivers to a combustion chamber of an engine a desired fuel-and-air mixture over a wide range of operating conditions including starting, warming up, and idle, of the engine as well as from idle to wide-open-throttle engine operation, provides an enriched fuel-and-air mixture to an engine combustion chamber to facilitate engine starting, provides a compact carburetor that includes a scavenging air passage, prevents delivery of scavenging air to an engine during engine starting and idle, enables relative movement between a throttle valve and a scavenging valve during at least a portion of throttle valve operation, uses a butterfly throttle valve and a rotary plug-type scavenging valve, minimizes or prevents scavenging air flow in a low speed range of the engine to achieve stable low speed operation and stable acceleration from idle, provides over a high speed range of the engine a relatively small change rate of opening area of the butterfly throttle valve compared to a relatively large change rate of the opening area of the plug-type scavenging valve, is of relatively simple design and economical manufacture and assembly, rugged, durable, reliable and in service has a long useful life.

Of course, other objects, features and advantages will be apparent in view of this disclosure to those skilled in the art. Various other carburetors embodying the invention may achieve more or less than the noted objects, features or advantages.

BRIEF DESCRIPTION OF THE DRAWINGS

These and other objects, features and advantages of the present invention will be apparent from the following detailed description of the preferred embodiments and best mode, appended claims, and accompanying drawings in which:

FIG. 2b is a side view of the carburetor of FIG. 1 taken in the direction indicated by arrow 2b in FIG. 2a;

FIG. 25a is a fragmentary sectional view of the carburetor of FIG. 19 showing how a first lever of the synchronizing mechanism is connected to a connecting rod and in the state of maximum fluid communication of FIG. 24a;

FIG. 33b is an end view of the valve case of FIG. 33a as viewed in the direction indicated by arrow 33b in FIG. 33a;

FIG. 34a is a fragmentary top view of a valve case alternative to the valve case of FIG. 33a; and FIG. 34b is an end view of the valve case of FIG. 34a as viewed in the direction indicated by arrow 34b in FIG. 34a.

DETAILED DESCRIPTION OF THE PREFERRED EMBODIMENTS

First Form

Figure 1:
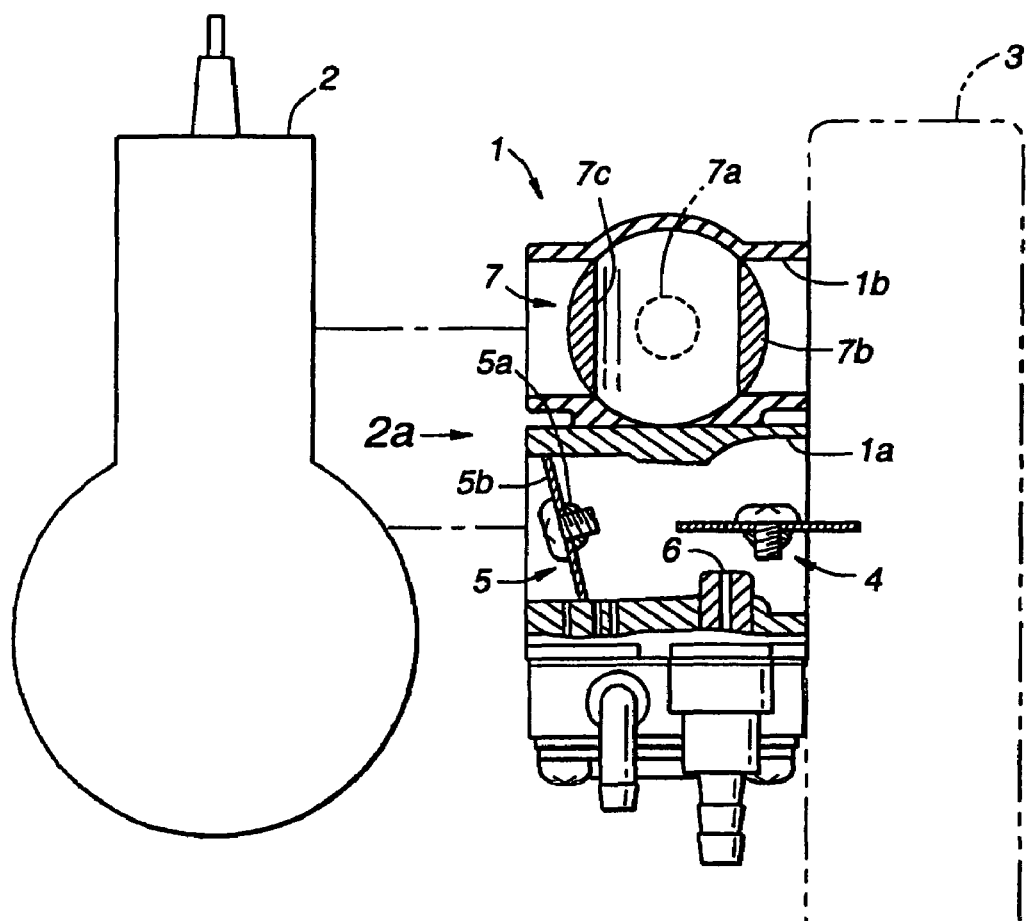
FIG. 1 is a fragmentary sectional side view of a presently preferred form of a scavenging carburetor including a butterfly throttle valve in a idle state and a plug-type scavenging valve in a closed state.

Referring in more detail to the drawings, FIG. 1 illustrates a presently preferred first form of a scavenging carburetor 1 for use with an air scavenged two-stroke internal combustion engine 2. The carburetor 1 preferably includes a two-piece body including a main body with a fuel-and-air mixture passage 1a for supplying a fuel-and-air mixture to the engine 2, and a separate scavenging body carried by the main body with a scavenging air passage 1b for delivering scavenging air to the engine 2. The passages 1a, 1b are spaced apart and extend generally parallel to each other, and the upstream ends thereof preferably communicate with an air cleaner 3.

The carburetor 1 also includes various valves for controlling fluid flow therethrough. A choke valve 4 is carried by the main body and disposed within the mixture passage 1a adjacent an upstream end thereof, and a throttle valve 5 is also carried by the main body and disposed within the mixture passage 1a adjacent a downstream end thereof. Between these valves 4, 5 is provided a fuel nozzle 6. An air scavenging valve 7 is carried by the scavenging body and disposed centrally within the scavenging air passage 1b. The throttle valve 5 includes a butterfly valve, and the scavenging valve 7 includes a plug-type valve, as shown in the drawing figures. The scavenging valve 7 controls flow by means of a valve member such as a cylinder or plug 7b with a bore 7c therethrough that preferably allows straight-through fluid flow in the fully open position and shuts off flow when the plug 7b is rotated about 90 degrees to block the scavenging air passage 1b. The bore 7c is preferably of roughly the same size and cross-sectional shape as the scavenging air passage 1b to permit fluid flow through the plug 7b. As used herein, the term plug-type valve includes plug and/or ball valves, and the plug 7b may be of any suitable shape including cylindrical, tapered, spherical, or the like.

Figure 2A:
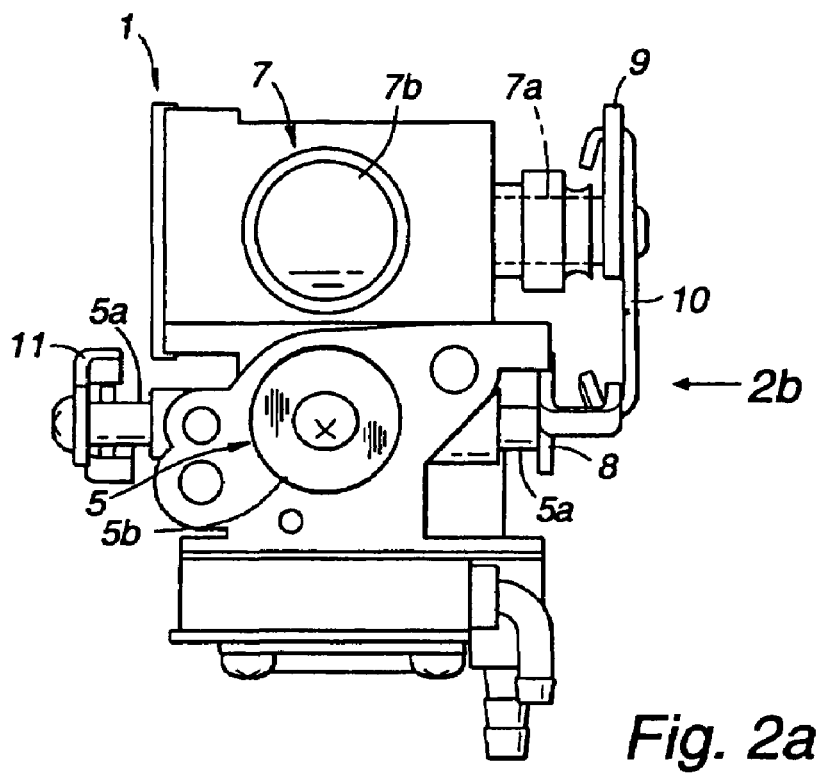
FIG. 2a is an end view of the carburetor of FIG. 1 taken in the direction indicated by arrow 2a in FIG. 1.
Figure 2B:
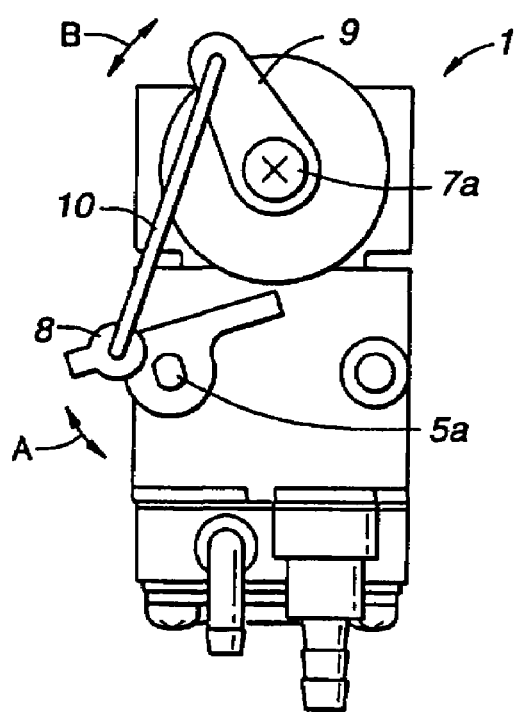

As also shown in FIGS. 2a and 2b, the carburetor 1 includes a support shaft 5a for the throttle valve 5 that extends transversely across the mixture passage 1a, and a shaft 7a for the scavenging valve 7 that extends transversely to the air passage 1b. The two shafts 5a and 7a are preferably disposed in such a manner that the axes of rotation of the two shafts 5a and 7a extend generally parallel with respect to each other. The support shafts 5a and 7a each extend out of the carburetor 1 on a same side thereof, and projecting ends of the shafts 5a, 7a are each attached to a throttle valve lever 8 and scavenging valve lever 9 respectively.

The levers 8 and 9 are connected to each other via a connecting wire or rod 10 so that a synchronizing mechanism is defined by the levers 8 and 9 and connecting rod 10. The synchronizing mechanism is not limited to the illustrated one using the connecting rod 10, but may include a transmission mechanism using gears, timing belts, cams or the like. Preferably, an opposite projecting end of the support shaft 5a extends out of an opposite side of the carburetor 1, and is attached to a throttle lever 11. Preferably, an end of a throttle wire (not shown) is connected to the throttle lever 11. The support shaft 5a and throttle valve lever 8 are turned or rotated in the direction indicated by arrow A in FIG. 2b by operating the throttle wire, which in turn causes the shaft 7a and lever 9 to be turned or rotated in the direction indicated by arrow B in FIG. 2b.

Figure 3:
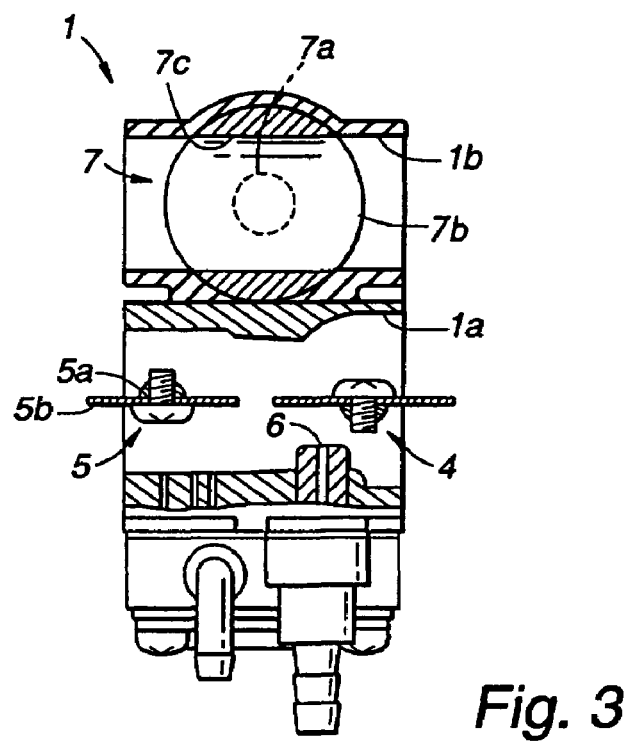
FIG. 3 is a sectional side view of the carburetor of FIG. 1 but showing the valves in their fully open state.
Figure 4:
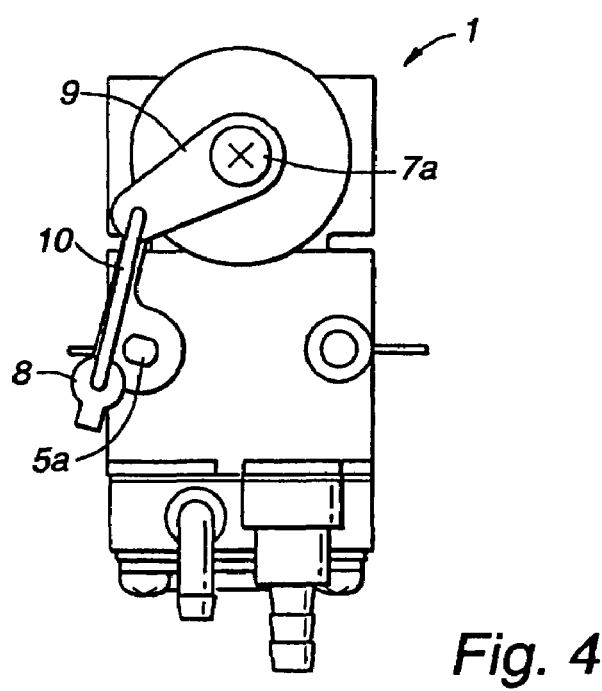
FIG. 4 is a side view of the carburetor of FIG. 1 and similar to FIG. 2b but showing the fully open state of the valves.

FIGS. 1, 2a, and 2b show the idle position of the throttle valve 5 and, in contrast, FIGS. 3 and 4 show the fully open state of the throttle valve 5. In other words, the scavenging valve 7 moves between its fully closed position and its fully open position in synchronism with the movement of the throttle valve 5 between its idle position and its fully open position, although at different rates of change in the opening areas thereof. In the scavenging valve 7 of the illustrated first form, the bore 7c of the cylindrical valve member 7b is fully blocked from the air passage 1b in the fully closed state and progressively overlaps with the air passage 1b as the support shaft 7a is turned in the valve opening direction.

Figure 5:
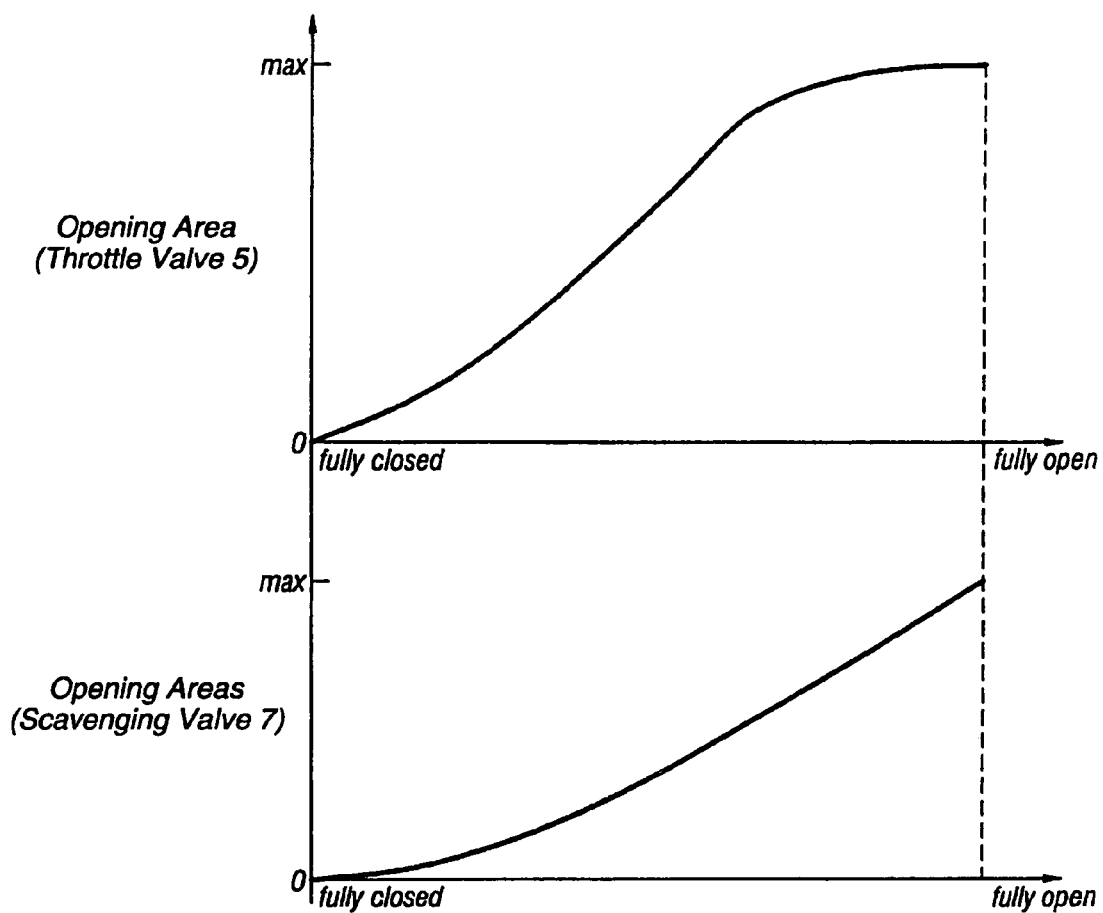
FIG. 5 is a graph showing the opening areas of the throttle valve and scavenging valve of the carburetor of FIG. 1 in relation to the opening angles thereof.

FIG. 5 shows the changes in the opening areas in relation with the rotational angles of the support shafts 5a and 7a of the throttle valve 5 and scavenging valve 7, respectively. If the angular position of the axis of the bore 7c in the fully closed state of the scavenging valve 7 is defined as zero, then the angular position of the bore axis when the scavenging valve 7 is fully open is 90 degrees. In contrast, a plane defined by the disk-shaped valve member 5b of the throttle valve 5 is offset by about 15 degrees with respect to a line perpendicular to the axis of the mixture passage 1a in the fully closed state of the throttle valve 5. The throttle valve 5 moves between the fully closed position and fully open position over the angular range of 75° from about 15 degrees from vertical to 90 degrees from vertical.

As shown in FIG. 5, because the throttle valve 5 includes a butterfly valve, it demonstrates a rate of change in opening area for a given angular movement of the throttle valve 5 that is relatively large over a relatively small initial opening angle range adjacent its idle or closed position, but that is relatively small over a relatively large final opening angle range adjacent its fully open position. In contrast, because the scavenging valve 7 includes a rotary plug-type valve, it demonstrates a rate of change in opening area for a given angular movement of the throttle valve 5 that is relatively small over a relatively small initial angle range opening angle range, but that is relatively large over a relatively large final opening angle range.

In other words, over a relatively small initial opening angle range, the opening area of the throttle valve 5 relatively quickly increases, while the opening area of the scavenging valve 7 remains relatively small, so that a relatively rich fuel-to-air mixture can be supplied to the engine 2. In contrast, over a relatively large opening final angle range, because the rate of increase of the opening area of the scavenging valve 7 is relatively large, a relatively large amount of air can be supplied to the engine 2, so as to better correspond with engine operating and scavenging requirements so that blow through of the fuel-and-air mixture to the engine exhaust port can be avoided and to provide a desirable relatively leaner fuel-to-air mixture.

Second Form

Figure 6A:
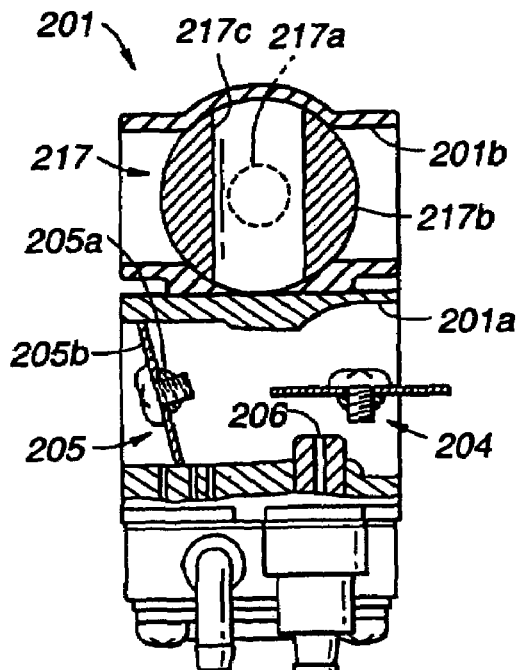
FIG. 6a is a sectional view similar to FIG. 1 showing a second presently preferred form of the scavenging carburetor including the butterfly throttle valve in an idle or closed state and a modified plug-type scavenging valve in a closed state.
Figure 6B:
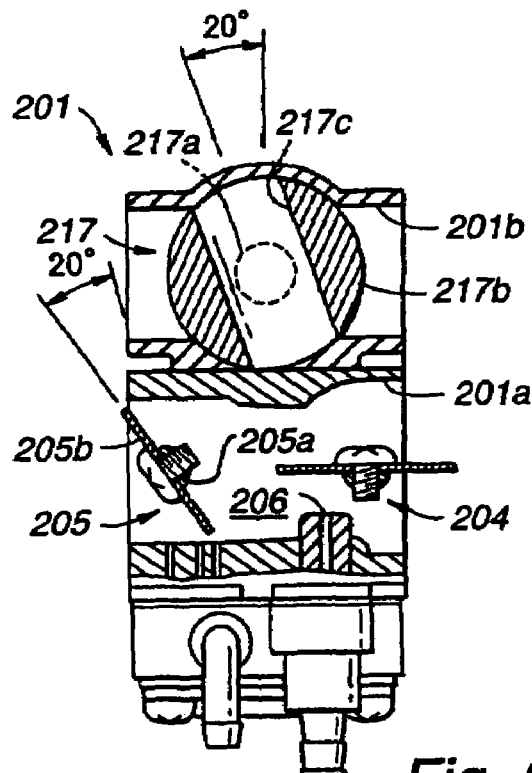
FIG. 6b is a sectional view of the carburetor of FIG. 6a, but showing the valves rotated toward a valve-open position.
Figure 7:
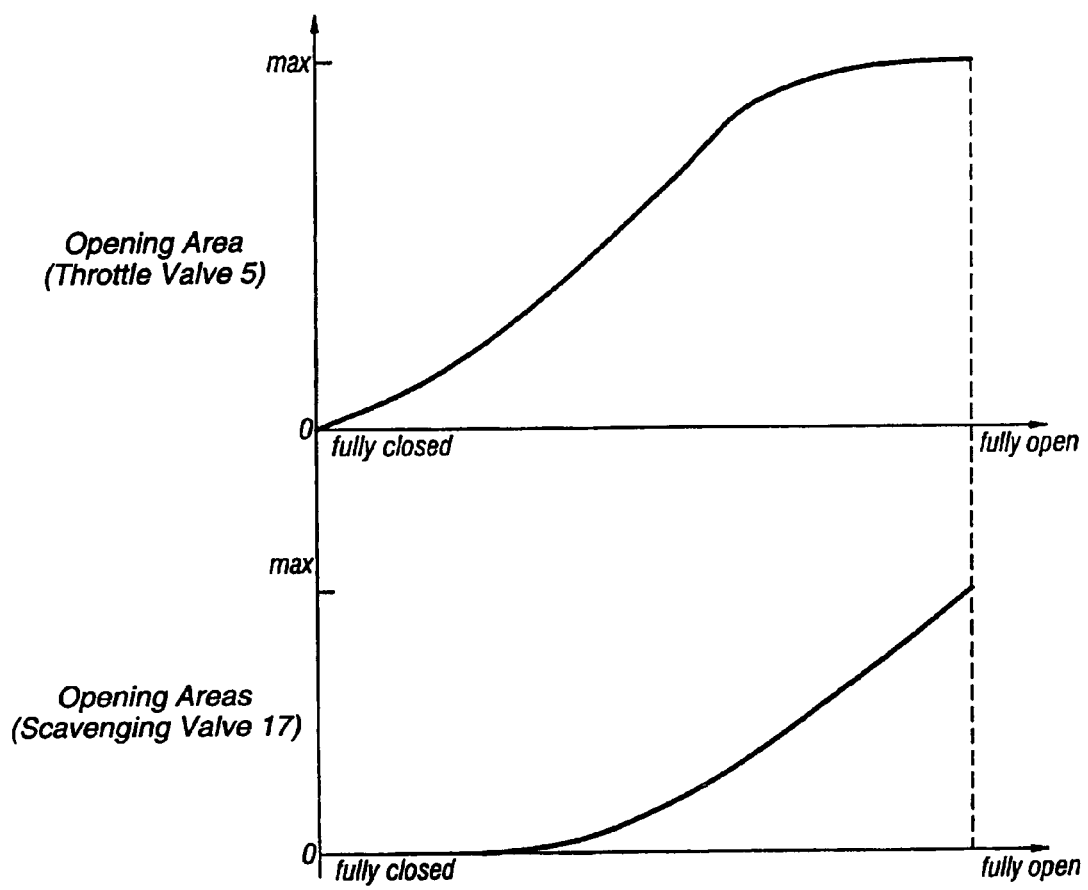
FIG. 7 is a graph showing the opening areas of the throttle valve and scavenging valve of the carburetor of FIG. 6a in relation to the opening angles thereof.

FIGS. 6a through 7 illustrate another presently preferred second form of a scavenging carburetor 201. This form is similar in many respects to the form of FIGS. 1 through 5 and like numerals between the forms generally designate like or corresponding elements throughout the several views of the drawing figures. Additionally, the description of the common subject matter may generally not be repeated here.

In certain scavenged engine types, it is desirable to prevent the supply of any scavenging air when the opening angle of a throttle valve is between idle or zero and a certain further small opening angle. In such cases, a scavenging valve 217 may be constructed as illustrated in FIG. 6a. More specifically, as shown in the drawing, a bore 217c of a cylindrical valve member 217b of the scavenging valve 217 remains fully closed by the inner wall of the carburetor 1 while the angular position of the scavenging valve 217 is between zero and about 20 degrees, and starts communicating with the air passage 1b only after the opening angle has been increased beyond about 20 degrees. Unlike the form of FIG. 1, here the bore 217c is preferably smaller in size than the scavenging air passage 1b for the same given outer diameters of the plugs 7b, 217b and inside diameters of the passage 1b.

The opening area of scavenging valve 217 in relation with its angular position is shown in FIG. 7. As shown, the opening area of the scavenging valve 217 remains zero (fully closed) over a relatively small opening angle range of rotation from 0 degrees to about 20 degrees, and then the scavenging valve 17 starts opening only after the opening angle has increased beyond about 20 degrees. Accordingly, the supply of scavenging air over an initial relatively small opening angle range of the throttle valve is prevented so that the engine 2 can be started and idle with the benefit of a relatively rich fuel-to-air mixture. Also, the supply of scavenging air over a further relative large opening angle range of the throttle valve is relatively large to prevent the fuel-to-air mixture from blowing out through the engine exhaust port and to provide a desirable fuel-to-air mixture over this range. Accordingly, there is no need for a lost motion mechanism, and carburetor design is simplified.

Third Form

Figure 8:
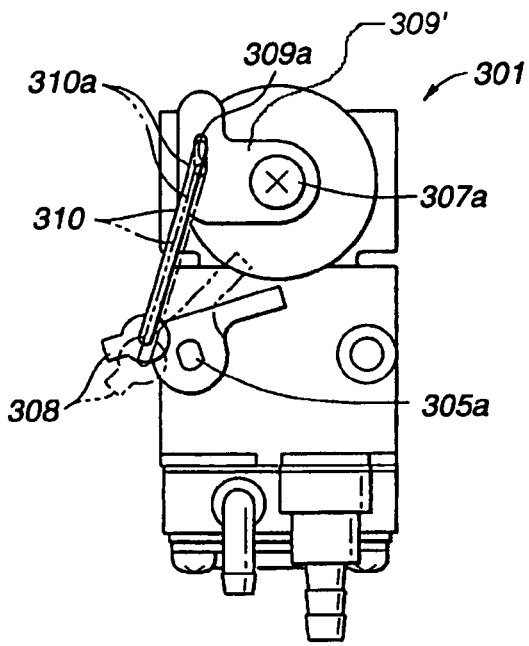
FIG. 8 is a side view of a third presently preferred form of a scavenging carburetor including a lost motion mechanism.

FIG. 8 illustrates another presently preferred third form of the scavenging carburetor 1. This form is similar in many respects to the forms of FIGS. 1 through 7 and like numerals between the forms generally designate like or corresponding elements throughout the several views of the drawing figures. Additionally, the description of the common subject matter may generally not be repeated here.

The means for preventing the supply of scavenging air over an initial relatively small opening angle range is not solely limited to the structure of the scavenging valve 7, 217 of the foregoing forms, but may also include the synchronizing mechanism illustrated in FIG. 8. In the form illustrated in FIG. 8, an elongate slot 309a is formed in the scavenging valve lever 309' for lost motion, and an end portion 310a of a connecting rod 310 is received in this slot 309a. The slot 309a is oriented in such a manner that a long side of the slot 309a extends substantially along the direction of the movement of the first throttle valve lever 308 over an initial small opening angle range thereof, and the end portion 310a of the connecting rod 310 is located adjacent the end of the slot 309a distal from the throttle valve 5 when in the fully closed position of the throttle valve 5 and the scavenging valve 7 or 217 (which position is indicated by the solid lines in the drawing). The scavenging valve 7 is normally biased in the direction to close the scavenging valve 7 by a return spring (not shown).

Thus, when the throttle valve 5 is between the idle or fully closed position (indicated by solid line), and an initial open position such as a 20-degree initial opening position (indicated by phantom line), the one end portion 310a of the connecting rod 310 simply moves within the slot 309a so that the scavenging valve 7 remains fully closed. Once the throttle valve 5 has opened beyond the 20-degree angle, the one end portion 310a of the connecting rod 310 engages the end of the slot 309a, and the scavenging valve 7 opens and closes in synchronism with movement of the throttle valve 5 throughout the remaining angular range of the throttle valve 5.

In this valve control arrangement, not only is a butterfly valve used for the throttle valve 5 and a plug-type valve for the scavenging valve 7, but also the supply of scavenging air is prevented while the throttle valve 5 is in an angular range from a fully closed state to a prescribed opening angle in a similar way to that shown in FIG. 7. In other words, a delay is provided between the initial opening of the throttle valve 5 and the initial opening of the scavenging valve 7.

Comparison of Valve Opening Area

Figure 9:
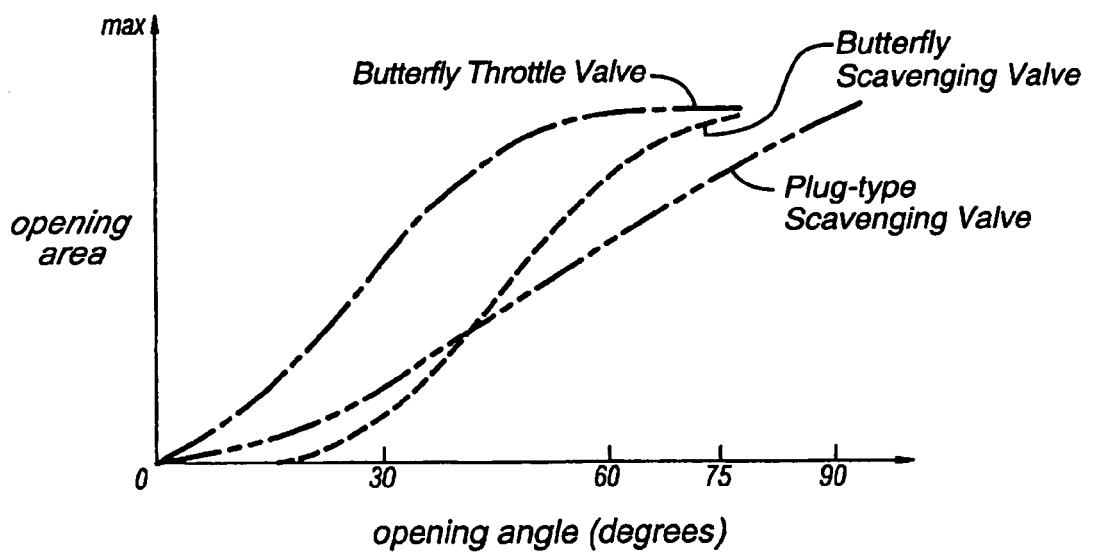
FIG. 9 is a graph showing the opening areas of two different types of butterfly valves and a rotary plug-type valve in relation to the opening angles thereof.
Figure 10A:
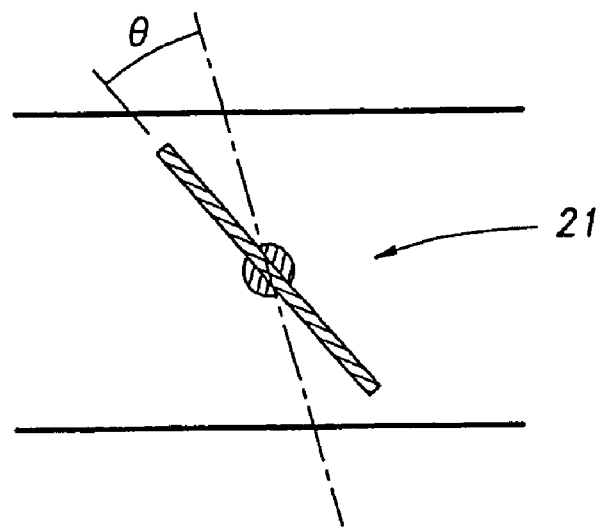
FIG. 10a is a cross-sectional view showing the opening angle of a butterfly valve.
Figure 10B:
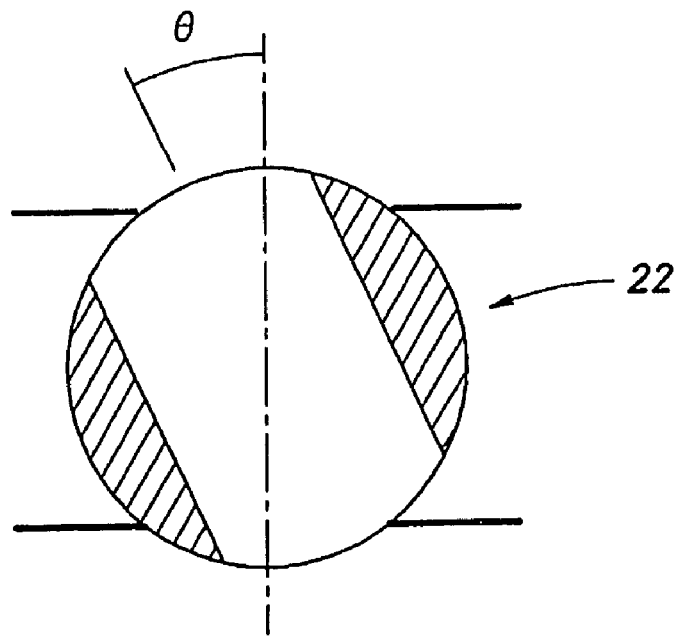
FIG. 10b is a cross-sectional view showing the opening angle of a plug-type valve.

FIG. 9 shows changes in valve opening area in relation to opening angle for different types of valves. In FIG. 9, a comparison is made between a butterfly-type throttle valve and a plug-type scavenging valve that provide the same opening area in a fully open state. FIGS. 10a and 10b illustrate a butterfly valve 21 and a plug-type valve 22, respectively, and a valve opening angle from a fully closed state is indicated by θ in each case. The opening area for the butterfly throttle valve is indicated by the single short dash chain phantom line in FIG. 9, while the opening area for the plug-type scavenging valve is indicated by the double short dash chain phantom line in FIG. 9.

As shown in FIG. 9, the butterfly throttle valve 21 demonstrates a relatively large change in opening area over an initial relatively small (or first) opening angle range (e.g. from 0 to about 30-35°) and a relatively small change in opening area over a final, further or second relatively large opening angle range (e.g. about 30-35° to about 75°), whereas the plug-type valve 22 demonstrates a relatively small change in opening area over an initial or first relatively small (or first) opening angle range (e.g. about 0° to about 30-35°) and a relatively large change in opening area over a further, final or second relatively large opening angle range (e.g. about 30-35° to about 90°) to yield a substantially proportional opening property. The rotary range of the valve opening angle is approximately 0 to 75 degrees for the butterfly throttle valve while that of the plug-type scavenging valve is approximately 0 to 90 degrees. The angles and ranges of angles disclosed herein are merely exemplary and those of ordinary skill in the art will recognize that any suitable angles and ranges of angles may be used. In any case, the graph shows the distinct advantageous combination of these properties of the two different valves.

A lost-motion mechanism may be interposed between the throttle valve 5 of the carburetor 1 and scavenging valve 7 by using a pin or wire engaged in a slot arrangement or the like to achieve a required synchronism between the throttle valve 5 and scavenging valve 7. For instance, when the throttle valve 5 includes a butterfly valve (as demonstrated by the opening property indicated by the single dash short chain phantom line in FIG. 9), and the scavenging valve 7 also includes a butterfly valve (as demonstrated by the broken line in FIG. 9), it is possible to prevent the supply of scavenging air until the opening angle of the throttle valve 5 increases to a certain extent over a relatively small initial opening angle range by opening the scavenging valve 7 only after the throttle valve 5 has been initially opened from its idle position to a certain extent by using a lost motion mechanism.

But it was discovered during development of the present invention that it is beneficial to use the mutually opposing properties of butterfly and plug-type valves, wherein the change rate of the opening area of a butterfly valve for a given increase in its opening angle is relatively large over a relatively small initial opening angle range, whereas the change rate of the opening area of a plug-type valve is relatively small over a relatively small initial opening angle range but is relatively large over a relatively large opening further final angle range.

As a result of this discovery, in all forms disclosed herein, a butterfly valve is preferably used for the throttle valve 5, and a plug-type valve is preferably used for the scavenging valve 7. Accordingly, over a relatively low speed range of the engine 2, the supply of scavenging air is minimized so as to achieve a stable low speed operation and a stable acceleration. Conversely, in a relatively high speed range of the engine, because the change rate of the opening area of the butterfly throttle valve for a given increase in the opening angle is relatively small, while that of the plug-type scavenging valve is relatively large, a relatively large amount of scavenging air is supplied for the given amount of fuel-and-air mixture that is supplied. Therefore, the fuel-and-air mixture supply and scavenging air supply can be matched with engine operating and scavenging requirements more easily than was possible with conventional constructions and combinations of throttle and scavenging valves.

Fourth Form

FIGS. 11 through 18 illustrate another presently preferred fourth form of a scavenging carburetor 401 that allows the timing of the opening of a scavenging valve 407 to be easily adjusted in relation to the opening angle of a throttle valve 405. This form is similar in many respects to the forms of FIGS. 1 through 10b and like numerals between the forms generally designate like or corresponding elements throughout the several views of the drawing figures. Additionally, the description of the common subject matter may generally not be repeated here.

Figure 11:
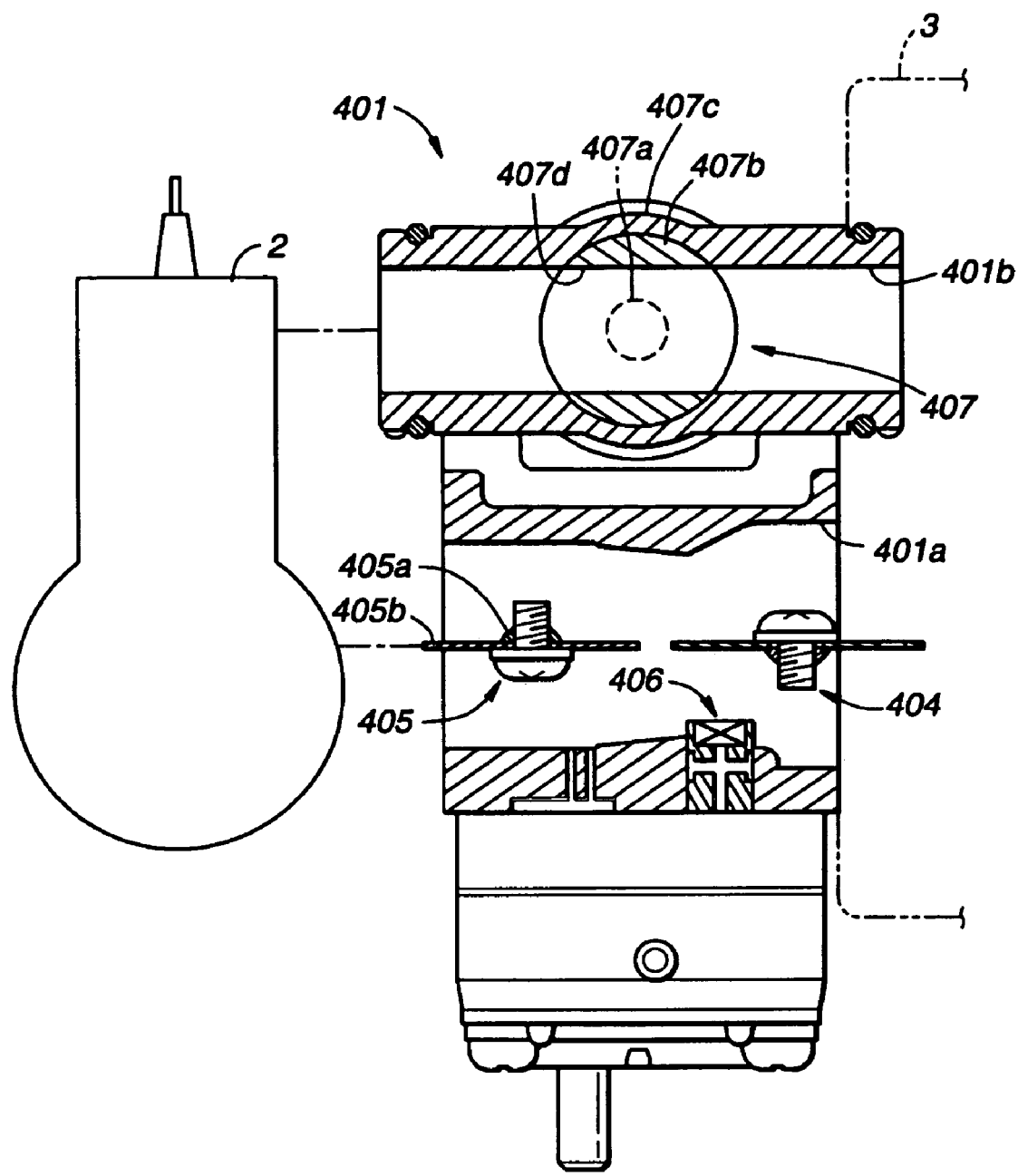
FIG. 11 is a fragmentary sectional side view of a fourth form of a scavenging carburetor and shown in a fully open state of a throttle valve.

Referring to FIG. 11, the carburetor 401 is adapted to be used in a scavenging two-stroke internal combustion engine 2, and includes a mixture passage 401a for supplying a fuel-and-air mixture to the engine 2 and an air passage 401b for supplying scavenging air to the engine 2. These two passages 401a and 401b extend substantially parallel with respect to each other, and the upstream ends thereof may be connected to an air cleaner 3.

The mixture passage 401a is provided with a choke valve 404 and a throttle valve 405, in that order from an upstream end. A fuel nozzle 406 is disposed between these valves. As shown in the drawing, the throttle valve 405 includes a butterfly valve including a throttle valve shaft 405a extending diametrically across the mixture passage 401a and a disk-shaped valve member 405b attached to the valve shaft 405a. A scavenging valve 407 is disposed in the air passage 401b which preferably has a circular cross section. The scavenging valve 407 is preferably a plug-type valve including a cylindrical plug or valve member 407b extending transversely across the air passage 401b and an integral scavenging valve shaft 407a extending substantially in parallel with the throttle valve shaft 405a. The cylindrical valve member 407b has a transverse through hole 407d so that the air passage 401b may be opened and closed depending on the angular position of the valve member 407b.

Figure 12:
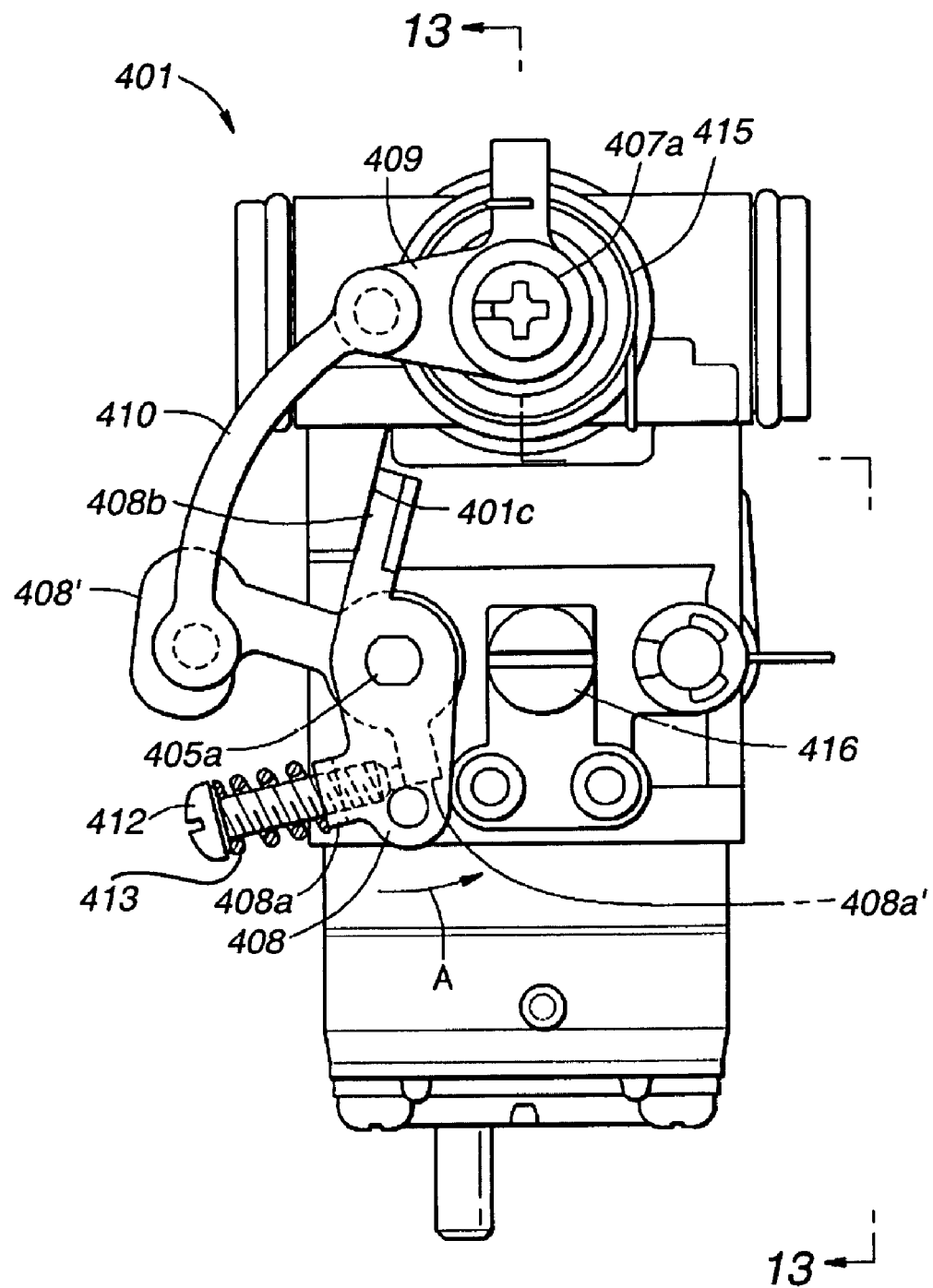
FIG. 12 is a side view of the carburetor of FIG. 11 including a synchronizing mechanism, shown in the fully open state of the throttle valve.
Figure 13:
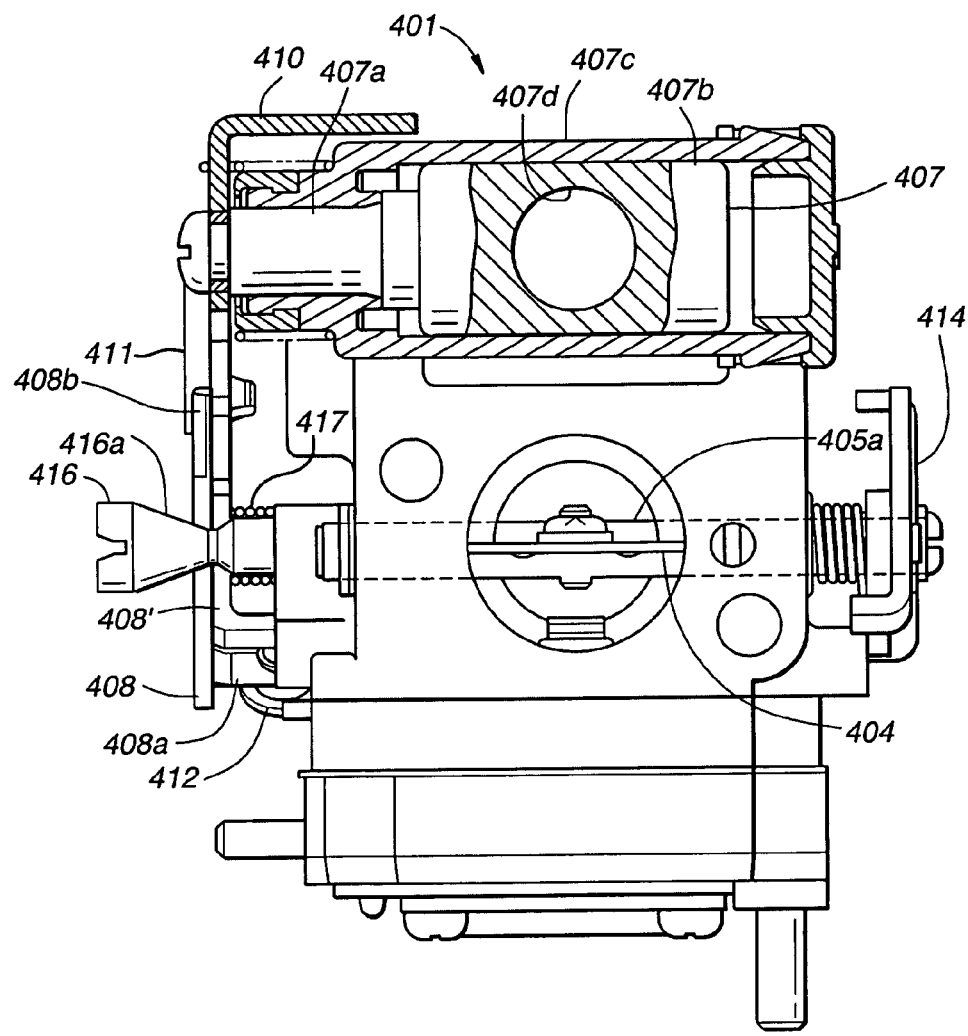
FIG. 13 is a fragmentary sectional view taken along line 13-13 in FIG. 12.

As also shown in FIGS. 12 and 13, the axes of the throttle valve shaft 405a and valve shaft 407a extend substantially parallel to each other and outward from a side of the carburetor 401 with axial ends outboard of the carburetor body.

FIGS. 12 and 13 also illustrate an adjustable synchronizing mechanism for adjustably synchronizing the opening of the throttle valve 405 with respect to the opening of the scavenging valve 407. The projecting end of the throttle valve shaft 405a fixedly carries a first throttle valve lever 408 extending radially outward, and the projecting end of the scavenging valve shaft 407a fixedly carries a scavenging valve lever 409 extending radially outward. A second throttle valve lever 408' is journaled for rotation on the first throttle valve lever 408' and is pivotally connected to the scavenging valve lever 409 via a connecting rod or lever 410.

The first throttle valve lever 408 is provided with a screw support portion 408a, which preferably extends substantially perpendicular to the axes of the valve shaft 405a, and an adjustment device such as an adjustment screw 412 threaded into the screw support portion 408a. A compression coil spring 13 is received over the shank of the adjustment screw 412 and between its head and the screw support portion 408a so that the adjustment screw 412 will be retained without any play or slack at any desired adjusted position. The forward end of the adjustment screw 412 abuts an engagement piece 408a' of the second throttle valve lever 408'. The adjustment screw 412 engages the engagement piece 408a' from such a direction that the second throttle valve lever 408' will rotate in unison with the first throttle valve lever 408 when the throttle valve shaft 405a is rotated in a direction to open the throttle valve as indicated by arrow A in FIG. 12 when the forward end of the adjustment screw 412 bears on the the engagement piece 408a'.

FIGS. 11 to 13 show the fully open state of the throttle valve 405. In the state illustrated in FIGS. 11 to 13, a radially extending arm 408b of the first throttle valve lever 408 is engaged by a stopper 401c protruding from the main body of the carburetor 401 to define the fully open state of the throttle valve 405.

As shown in FIG. 13, an opposite axial end of the throttle valve shaft 405a of the throttle valve 405 projects out of an opposite side of the carburetor 401, and the projecting end is fixed to a throttle lever 414 to which a wire of a remote control cable (not shown) is connected. The portion of the throttle valve shaft 405a extending from the carburetor main body toward the first throttle valve lever 408 is provided with a return torsion spring 417 for yieldably biasing the throttle valve shaft 405a toward the fully closed position.

A scavenging valve return torsion spring 415 is interposed between the scavenging valve lever 409 and a valve case 407c carried by a part of the carburetor main body for yieldable biasing the scavenging valve shaft 407a and the scavenging valve 407 toward the fully closed position to shut off the air passage 401b.

Figure 14:
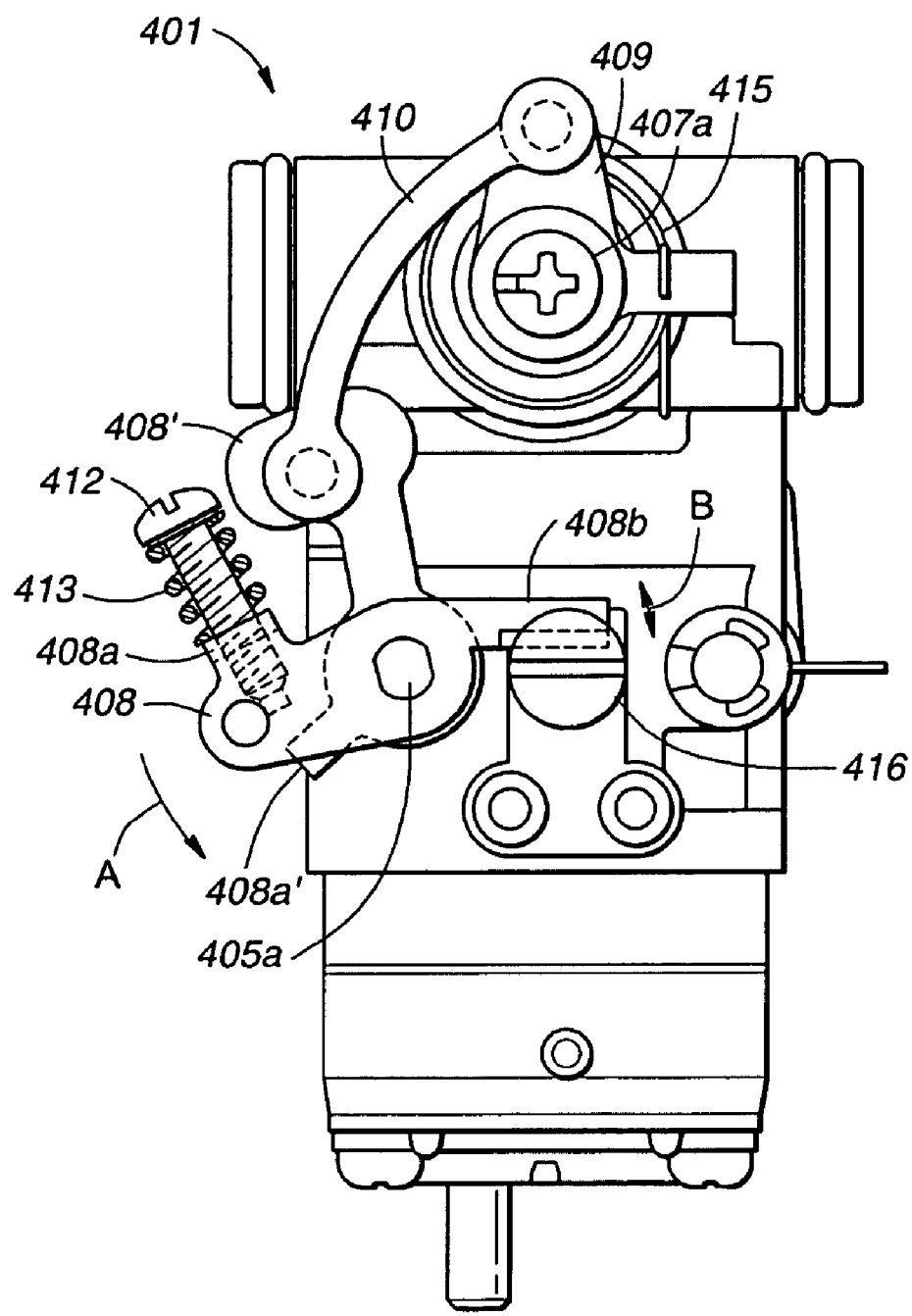
FIG. 14 is a side view of the carburetor of FIG. 11 with the synchronizing mechanism, shown in a fully closed state of the throttle valve.
Figure 15:
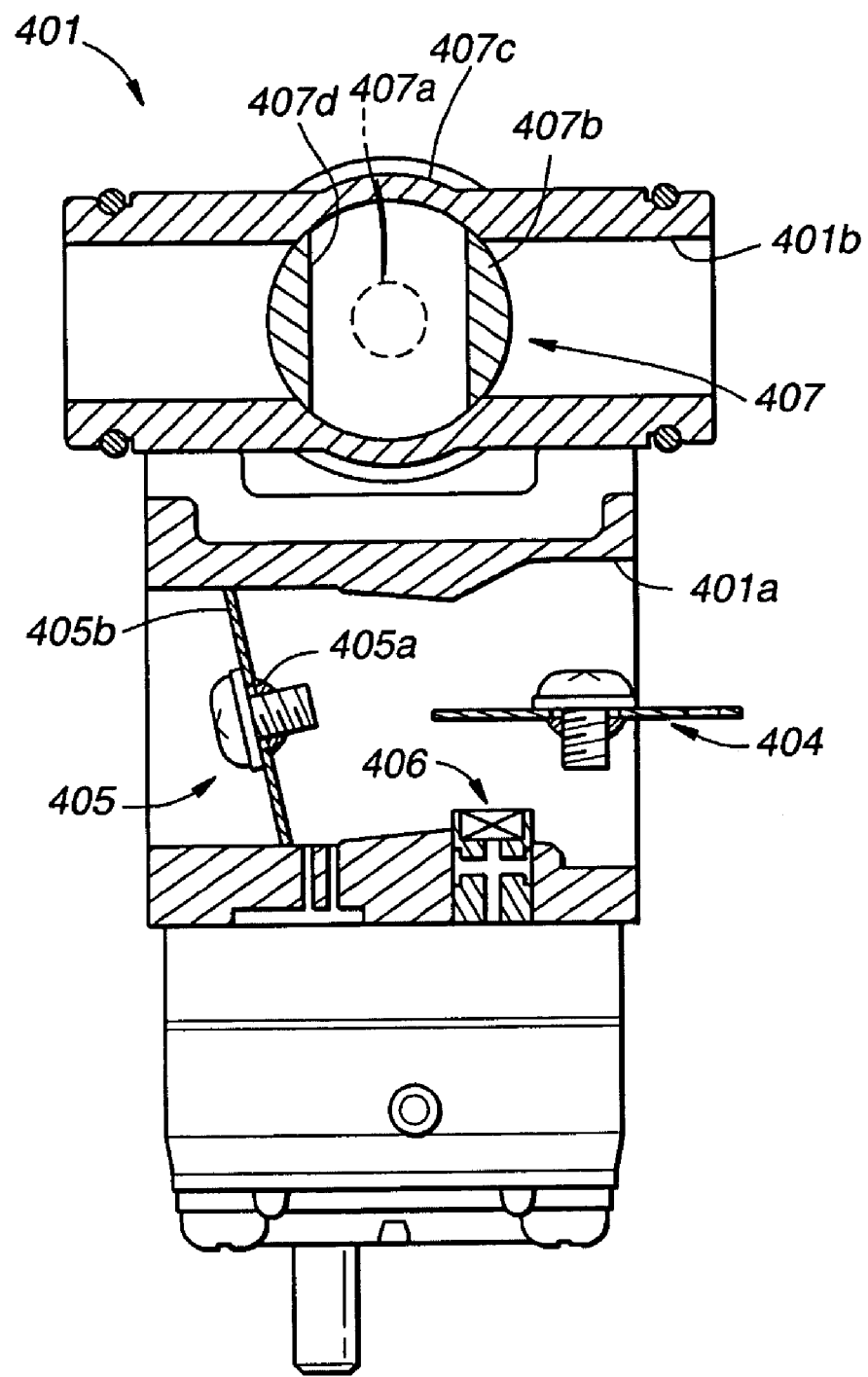
FIG. 15 is a sectional side view of the carburetor of FIG. 11 shown in the fully closed state of the throttle valve.

FIGS. 14 and 15 show the state where the throttle valve 405 and scavenging valve 407 are both fully closed prior to starting the engine 2. FIGS. 14 and 15 correspond to FIGS. 12 and 11, respectively, and the corresponding parts are denoted with like numerals without repeating the description of such parts. In the fully closed state, the valve member 405b of the throttle valve 405 is returned by the spring 417 all the way to the position completely shutting off the mixture passage 401a (FIG. 13). FIG. 15 shows the state where the mixture passage 401a is completely shut off by the valve member 405b, but an idle opening adjustment screw 416, which is threaded into a portion of the carburetor main body, adjustably defines an idle opening position of the throttle valve 405.

As shown in FIG. 13, a tapered surface 416a is formed between a head and threaded part of the idle opening adjustment screw 416, and the arm 408b of the first throttle valve lever 408 is engaged by this tapered surface 416a at the idle opening of the throttle valve 405. More specifically, the point of the tapered surface 416a at which the arm 408b is engaged moves in a radial direction as the idle opening adjustment screw 416 is turned. This shift in the point of engagement causes a rotation of the arm 408b as indicated by arrow B in FIG. 14 so that the opening of the throttle valve 405 changes. Thus, the opening angle and extent of the opening of the throttle valve 405 at the time of idling can be adjusted in this manner.

As shown in FIG. 14, the forward end of the adjustment screw 412 is spaced from the engagement piece 408a' in the fully closed state of the throttle valve 405. As the valve member 405b of the throttle valve 405 is turned toward the fully open position by actuating the throttle lever 414 (FIG. 13), the first throttle valve lever 408 turns in the direction indicated by arrow A in FIG. 14. Only when the first throttle valve lever 408 has rotated to the position illustrated in FIG. 16, does the forward end of the adjustment screw 412 (which is integrally connected to the first throttle valve lever 408) come into engagement with the engagement piece 408a'. The throttle valve 405 at such a time may be rotated through about 30°, for instance, from its closed position, and this state is illustrated in FIG. 17. Because the forward end of the adjustment screw 412 only abuts the engagement piece 408a', the second lever 408' has yet to turn and the valve member 407a of the scavenging valve 407 remains fully closed under the yieldable biasing force of the scavenging valve return spring 415. The opening angle of the throttle valve 405 in this state may be 30 degrees, for instance.

Figure 16:
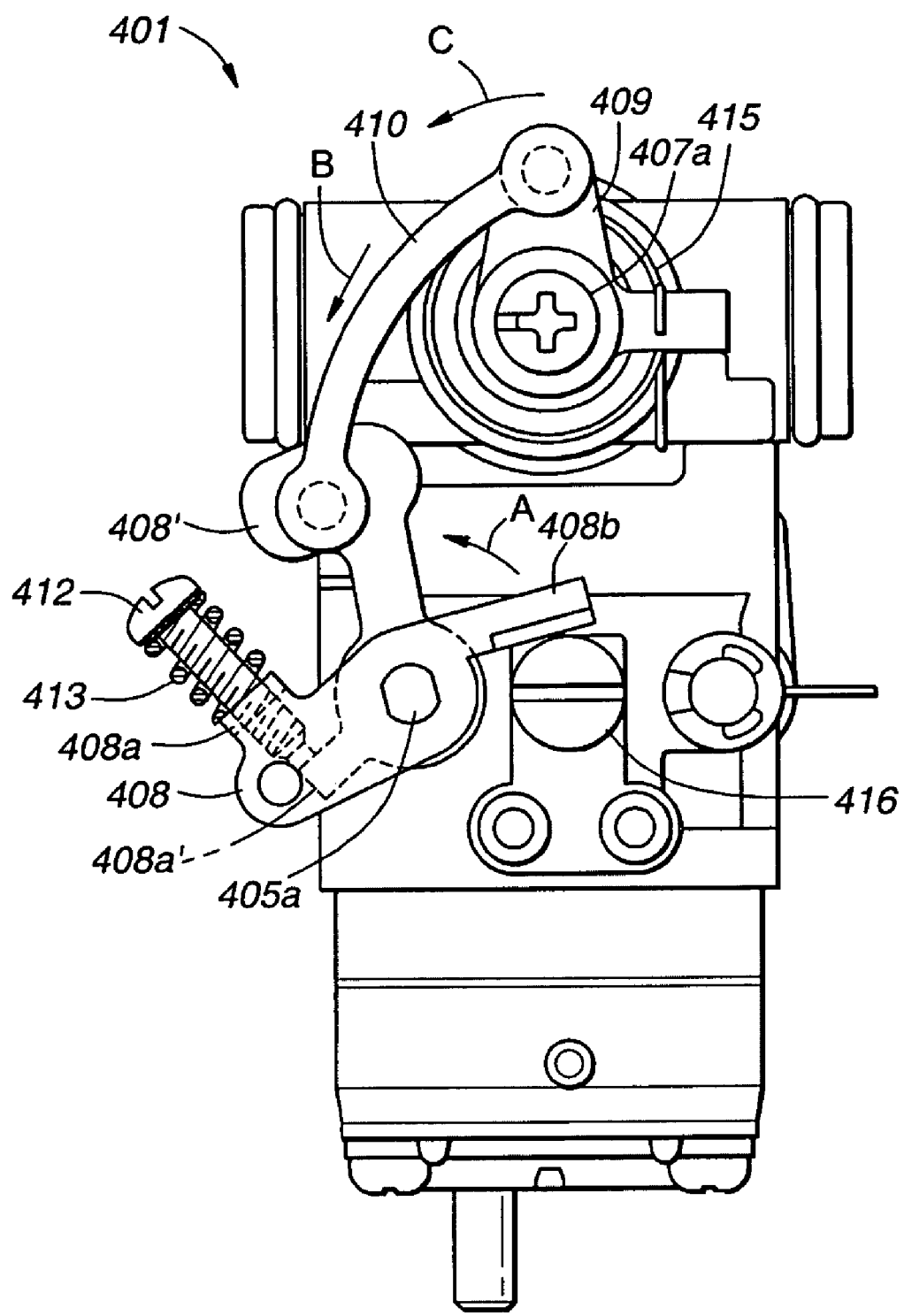
FIG. 16 is a side view of the carburetor of FIG. 11 shown in a state wherein an opening angle of the throttle valve is about 30 degrees.
Figure 17:
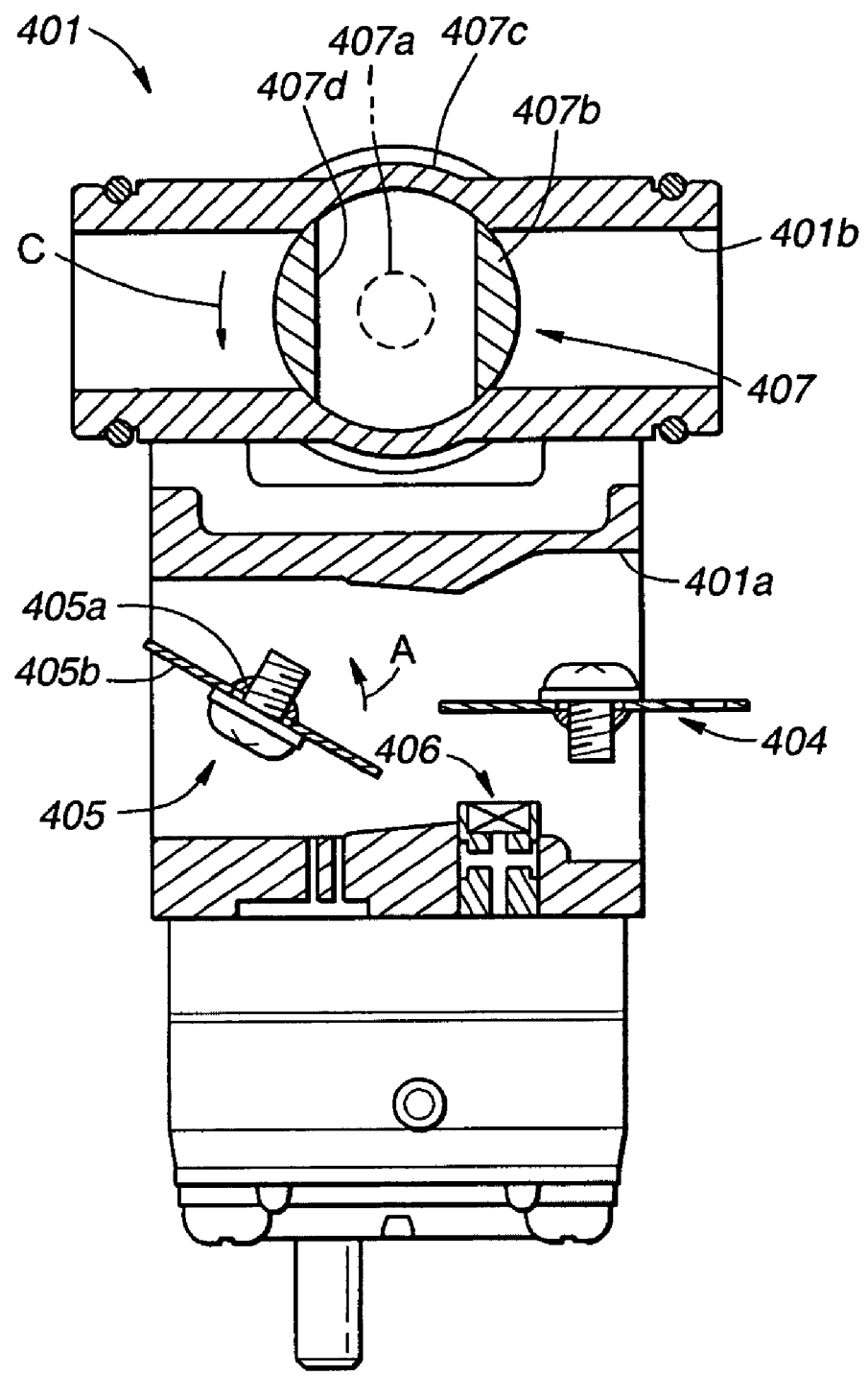
FIG. 17 is a sectional side view of the carburetor of FIG. 11 shown according to the state of FIG. 16.

As the throttle valve 405 is opened beyond the state illustrated in FIGS. 16 and 17, the forward end of the adjustment screw 412 continues to engage the engagement piece 408a' as the first throttle valve lever 408 is turned until the fully open state is reached. During this time, the adjustment screw 12 moves the second lever 408' and turns it in the direction indicated by arrow A in FIG. 16. This movement also causes the connecting rod 410 connected to the second lever 408' to be pulled in the direction indicated by arrow B in FIG. 16 and the scavenging valve lever 409 to be turned in the direction indicated by arrow C against the spring force of the scavenging valve return spring 415 with the result that the scavenging valve 407 opens. The change in the opening angle of the scavenging valve 407 in relation with the opening angle of the throttle valve 405 after the scavenging valve 407 has started opening is determined by the geometry of the synchronizing mechanism including the levers 408' and 409 and the connecting rod 410. The mechanism for synchronizing the opening angles of the scavenging valve 407 and throttle valve 405 is not limited to the illustrated mechanism but may include any other suitable transmitting mechanisms including those using gears, timing belts, cams or the like.

Figure 18:
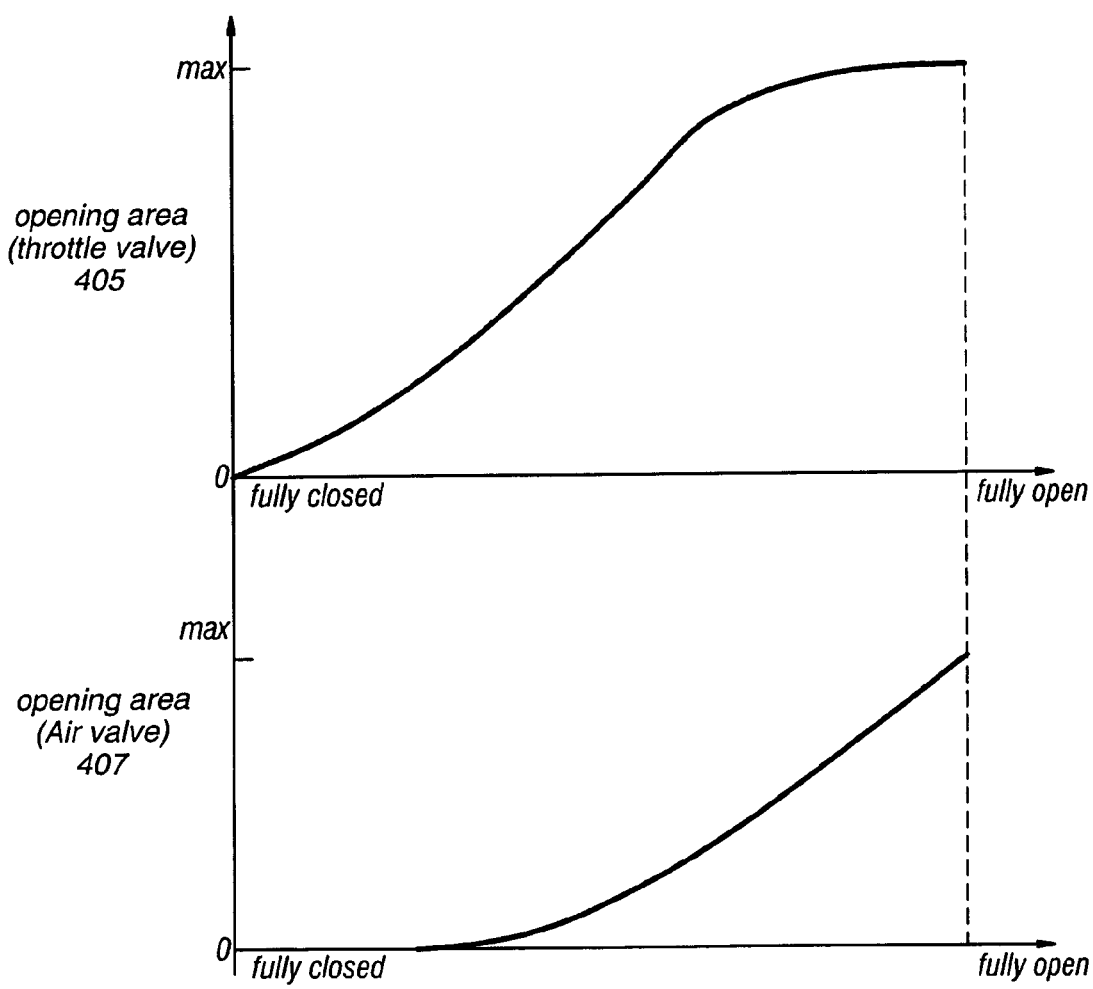
FIG. 18 is a graph showing the opening areas of the throttle valve and scavenging valve of the carburetor of FIG. 11 in relation to the opening angles thereof.

The characteristics of the opening areas of the valves of this carburetor 401 in relation with their respective opening angles is shown in FIG. 18. As shown in FIG. 18, the opening area of the scavenging valve 407 remains fully closed or at zero over a relatively small initial opening angle region until the opening angle increases to about 30-35 degrees, and the scavenging valve 407 starts opening only after the opening angle has increased beyond about 30-35 degrees. Accordingly, the supply of scavenging air over a relatively small initial opening angle region is prevented so that the engine 2 can be started and idle with the benefit of a relatively rich fuel-to-air mixture.

Also, over a relatively large opening angle region, because the increase rate of the opening area of the plug-type scavenging valve 407 is greater than that of the butterfly throttle valve, the scavenging air can be supplied not only in a relatively large amount but also in such an amount as to correspond to the opening area of the throttle valve 405, and the blow-through of the fuel-to-air mixture to the exhaust port can thus be avoided. Therefore, the supply of the scavenging air can be stopped until the throttle valve 405 has been opened to a prescribed angle without complicating the design and manufacture of the carburetor 401. Also, because the prescribed angle of the throttle valve 405 at which the supply of the scavenging air starts can be easily adjusted after the carburetor 401 is assembled, the valve opening characteristics of the carburetor 401 can be adjusted to design even when there are manufacturing variations in tuning a particular carburetor to a particular engine.

Because the synchronizing mechanism for synchronizing the opening angles of the two valves includes an adjustment device, the opening angle of the throttle valve at which the scavenging valve starts to open can be adjusted. The synchronizing mechanism includes preferably the first throttle valve lever fixedly secured to the throttle valve shaft, the second throttle valve lever rotatably carried by the throttle valve shaft, the scavenging valve lever fixedly secured to the scavenging valve shaft, the connecting rod connecting the second throttle valve lever to the scavenging valve lever and the opening angle adjustment device provided between the first and second throttle valve levers to define a prescribed opening angle of the butterfly throttle valve at which the plug-type scavenging valve starts to open. Accordingly, even if there are manufacturing variations in the carburetor 401 and/or engine 2 that would cause an operational mismatch between the carburetor 401 and engine 2, adjustments can be made after the carburetor 401 is mounted to the engine 2 so that a highly adaptable and adjustable carburetor 401 can be provided at a low cost.

Fifth Form

FIGS. 19 through 25b illustrate another presently preferred fifth form of a scavenging carburetor 501 that may be adapted to different engines requiring different amounts of scavenging air without having to change component parts of the carburetor 501. This form is similar in many respects to the forms of FIGS. 1 through 18, and like numerals between the forms generally designate like or corresponding elements throughout the several views of the drawing figures. Additionally, the description of the common subject matter may generally not be repeated here.

In typical scavenging valve arrangements, the amount of scavenging air when a scavenging valve is fully open is determined by the opening area defined by an overlap between an air passage formed in a carburetor body and a through hole formed in the valve member disposed in the air passage. In typical rotary plug valves, the cross-sectional area of the air passage is identical to that of the through hole of the valve member and these two openings coaxially align with each other in a fully open state. But different engines are provided with different specifications depending on the specific engine design and application. Nonetheless, the same throttle valve may be used in different engines if they have substantially the same displacement. But it may be desirable to vary the amount of scavenging air depending on the different specifications of the engines, and this necessitates changing the component parts of the scavenging valve from one engine to another. This results in the need to stock a large number of different component parts, and is not desirable.

Figure 19:
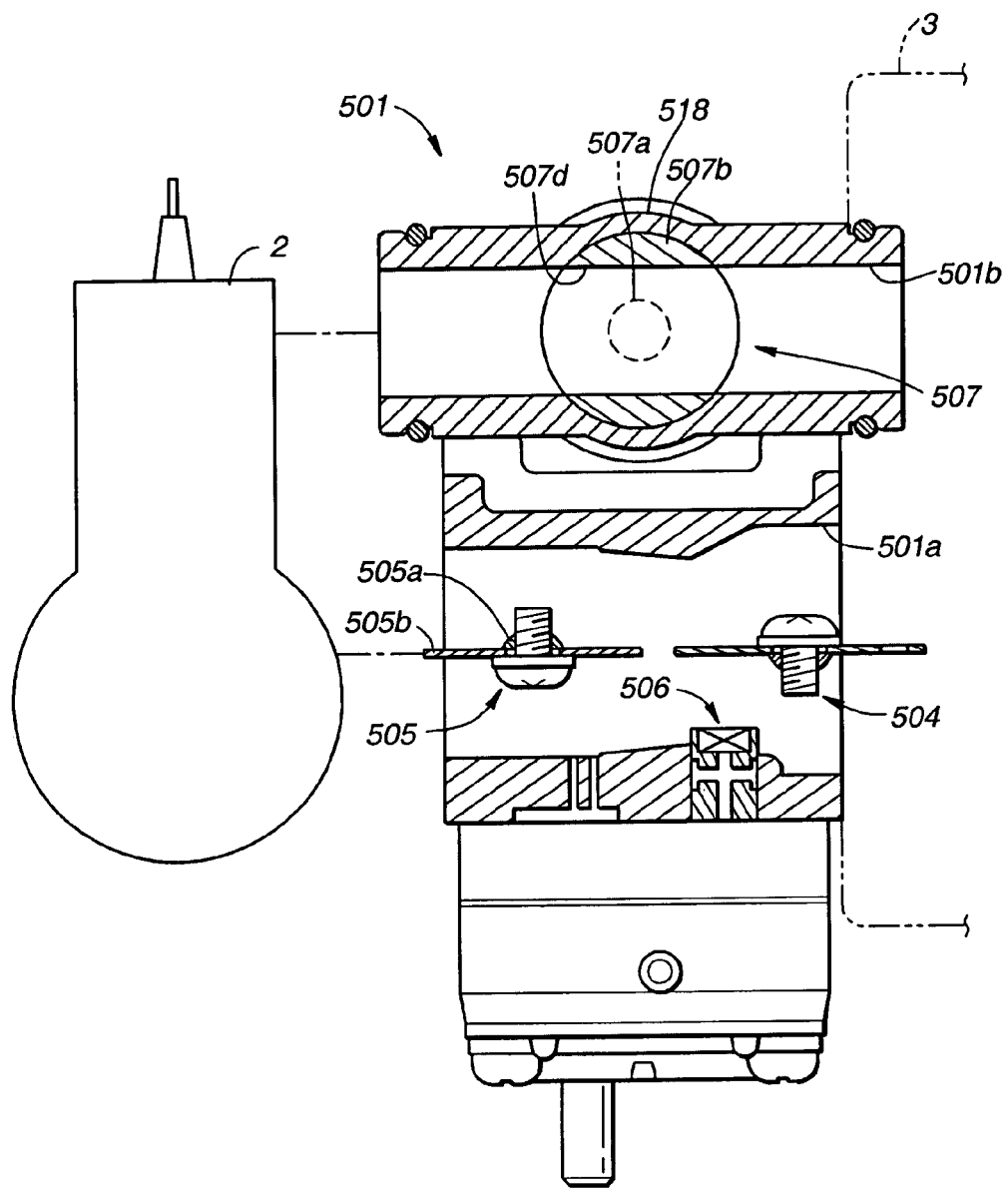
FIG. 19 is a fragmentary sectional side view of a fifth form of a scavenging carburetor, shown in a fully open state of a throttle valve.

Therefore, as shown in FIG. 19, the carburetor 501 is adapted to be used in a scavenging two-stroke internal combustion engine, and comprises a mixture passage 501a for supplying mixture to the engine 2 and an air passage 501b for supplying scavenging air to the engine 2. These two passages 501a and 501b extend generally in parallel to each other, and the upstream ends thereof preferably are connected to an air cleaner 3.

The mixture passage 501a is provided with a choke valve 504 and a throttle valve 505. A fuel nozzle 506 is disposed between these valves. The air passage 501b has a circular cross section, and is provided with a scavenging valve 507. As shown in the drawing, the throttle valve 505 includes a butterfly valve including a throttle valve shaft 505a extending diametrically across the mixture passage 1a and a disk-shaped valve member 505b fixedly attached to the valve shaft 505a. The scavenging valve 507 preferably includes a rotary plug-type valve including a cylindrical valve member 507b extending transversely across the air passage 501b and an integral valve shaft 507a extending parallel to the throttle valve shaft 505a. The valve member 507b is rotatably received in a valve case 507c, which is formed in the carburetor main body and also defines the air passage 501b. The cylindrical valve member 507b is provided with a transverse through hole 507d so that the air passage 501b may be opened and closed depending on the angular position of the valve member 507b.

Figure 20:
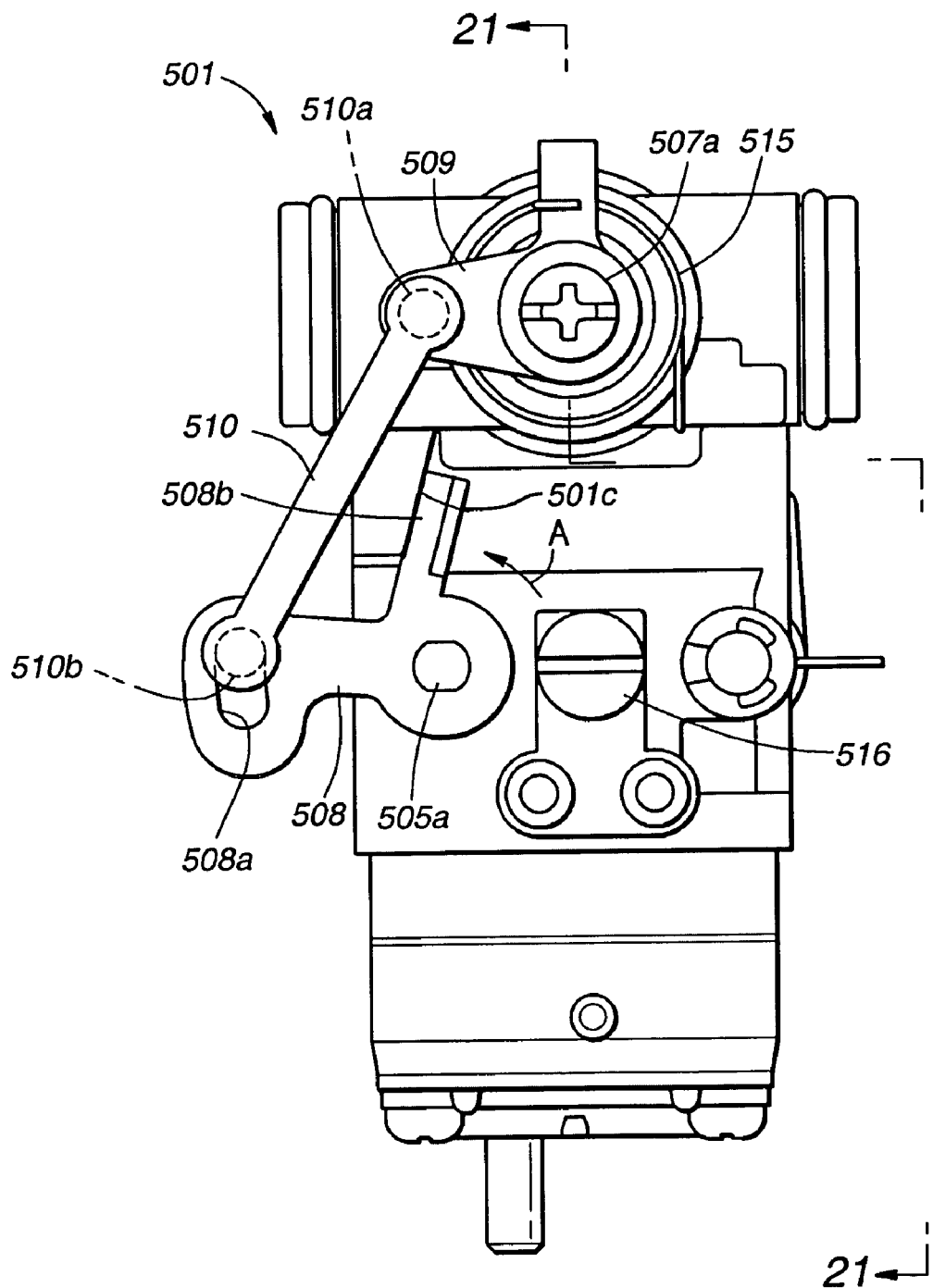
FIG. 20 is a side view of the carburetor of FIG. 19 including a synchronizing mechanism, shown in the fully open state of the throttle valve.
Figure 21:
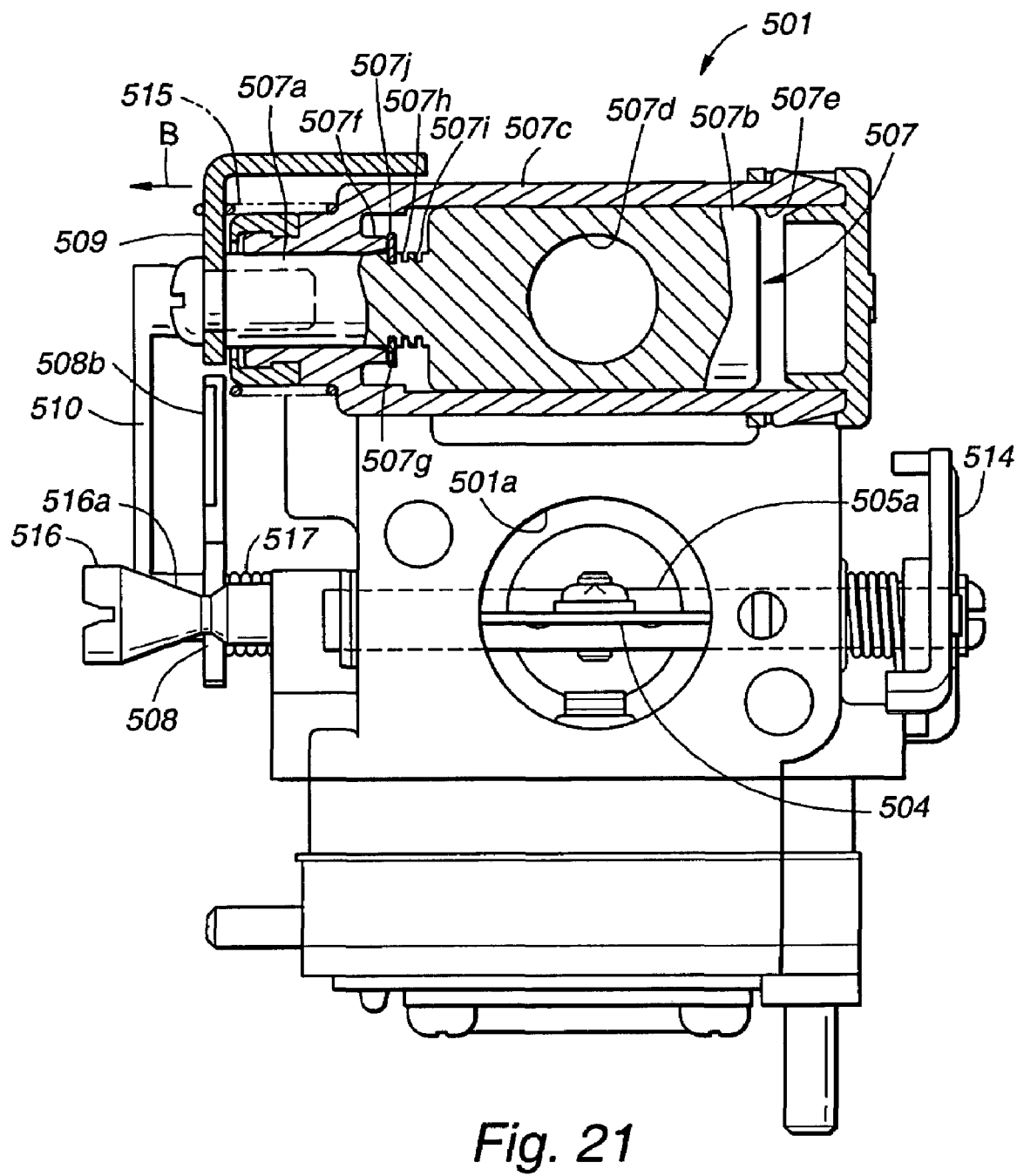
FIG. 21 is a cross-sectional view taken along line 21-21 in FIG. 20.

As shown in FIGS. 20 and 21, the axes of the throttle valve shaft 505a and scavenging valve shaft 507a extend substantially parallel to each other and one above the other. The axial ends of the throttle valve shaft 505a and valve shaft 507a project outward from a same side of the carburetor 501. The projecting end of the throttle valve shaft 505a fixedly carries a throttle valve lever 508 extending radially outward, and the projecting end of the scavenging valve shaft 507a fixedly carries a scavenging valve lever 509 extending radially outward. The throttle valve lever 508 is connected to the scavenging valve lever 509 via a connecting rod 510.

One end of the connecting rod 510 is rotatably connected to the scavenging valve lever 509 via a pin 510a provided on the one end of the connecting rod 510. As shown in FIG. 20, the throttle valve lever 508 is generally L-shaped. One end of the throttle valve lever 508 is formed with a non-circular passage into which the throttle valve shaft 505a fits. At another end of the first throttle valve lever 508, an engagement pin 510b of the connecting rod 510 is slidably received in an arcuate guide slot 508a so as to be movable within the guide slot 508a. In this way, the connecting rod 510 is connected to the throttle valve lever 508 in such a manner that lost motion is provided with respect to the rotational direction of the throttle valve lever 508.

FIGS. 19 through 21 show the fully open state of the throttle valve 505. In the state illustrated in FIGS. 19 through 21, an arm 508b extends radially outward from the throttle valve lever 508 and is engageable by a stopper 501c protruding from the main body of the carburetor 501. The throttle valve lever 508 rotates in the direction indicated by arrow A from the fully closed position until the arm 508b is engaged by the stopper 501c.

As shown in FIG. 21, an opposite axial end of the throttle valve shaft 505a of the throttle valve 505 projects out of an opposite side of the carburetor 501, and is fixedly provided with a throttle lever 514 to which an actuator wire of a remote control cable (not shown) is connected. The part of the throttle valve shaft 505a extending from the carburetor main body toward the first throttle valve lever 508 is provided with a return torsion spring 517 for yieldably biasing the throttle valve shaft 505a toward the fully closed position.

A scavenging valve return torsion spring 515 is interposed between the lever 509 and the valve case 507c carried by the carburetor main body for yieldable biasing the scavenging valve shaft 507a of the scavenging valve 507 toward the fully closed position to shut off the air passage 501b. This scavenging valve return spring 515 functions also as a compression coil spring that yieldably biases the scavenging valve lever 509, and hence the scavenging valve shaft 507a, in an axially outward direction as indicated by arrow B in FIG. 21.

A valve member 507b is coaxially received and journaled in a cylindrical support hole 507e of the valve case 507c so as to be simultaneously rotatable and axially movable. A base end of the scavenging valve shaft 507a adjacent to the valve member 507b is exposed within the support hole 507e, and the exposed part of the scavenging valve shaft 507a is formed with three evenly spaced circumferential grooves 507g, 507h and 507i (in the case of the illustrated form). As shown in FIG. 21, the first circumferential groove 507g adjacent to the projecting end of the scavenging valve shaft 507a is fitted with a C-shaped clip 507j (engagement member) preferably composed of sheet metal. The clip 507j may instead be a circlip, E-ring, or the like as long as it has a larger outer diameter than that of the scavenging valve shaft 507a.

An annular projection 507f serves as a stopper and is formed on an inner wall of the support hole 507e of the valve case 507c so as to surround the scavenging valve shaft 507a and project axially toward the valve member 507b. The scavenging valve shaft 507a is yieldably biased by the scavenging valve return spring 515 in a direction to urge the valve member 507b toward the annular projection 507f as indicated by arrow B in FIG. 21 so that the scavenging valve shaft 507a and valve member 507b move toward the annular projection 507f until the clip 507j abuts the projecting end of the annular projection 507f and the valve member 507b is thereby axially positioned. Thus, the circumferential grooves 507g, 507h, 507i, clip 507j, and annular projection 507f define a valve adjustment or positioning mechanism.

Figure 22:
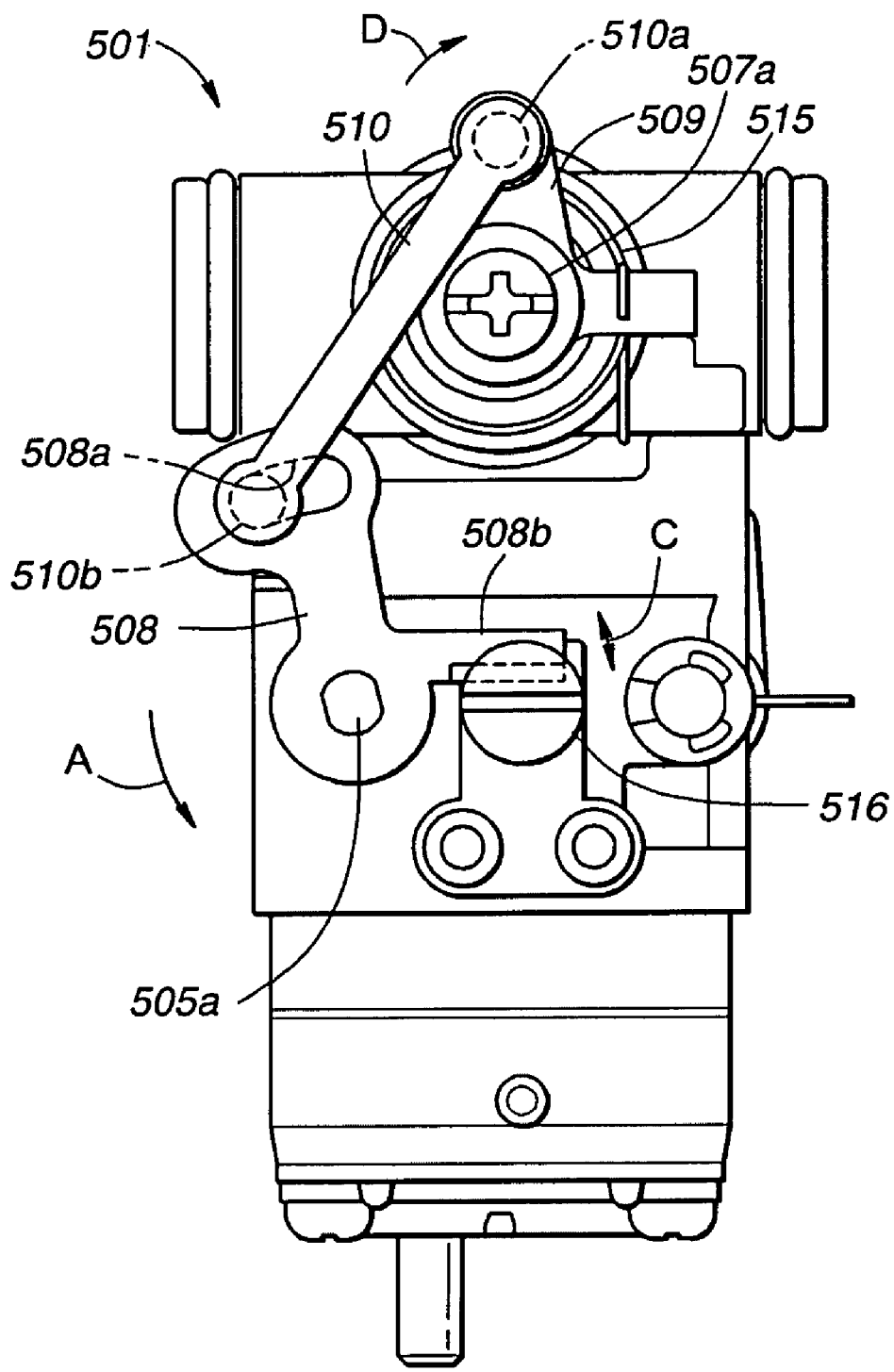
FIG. 22 is a side view of the carburetor of FIG. 19 including the synchronizing mechanism, shown in a fully closed state of the throttle valve.
Figure 23:
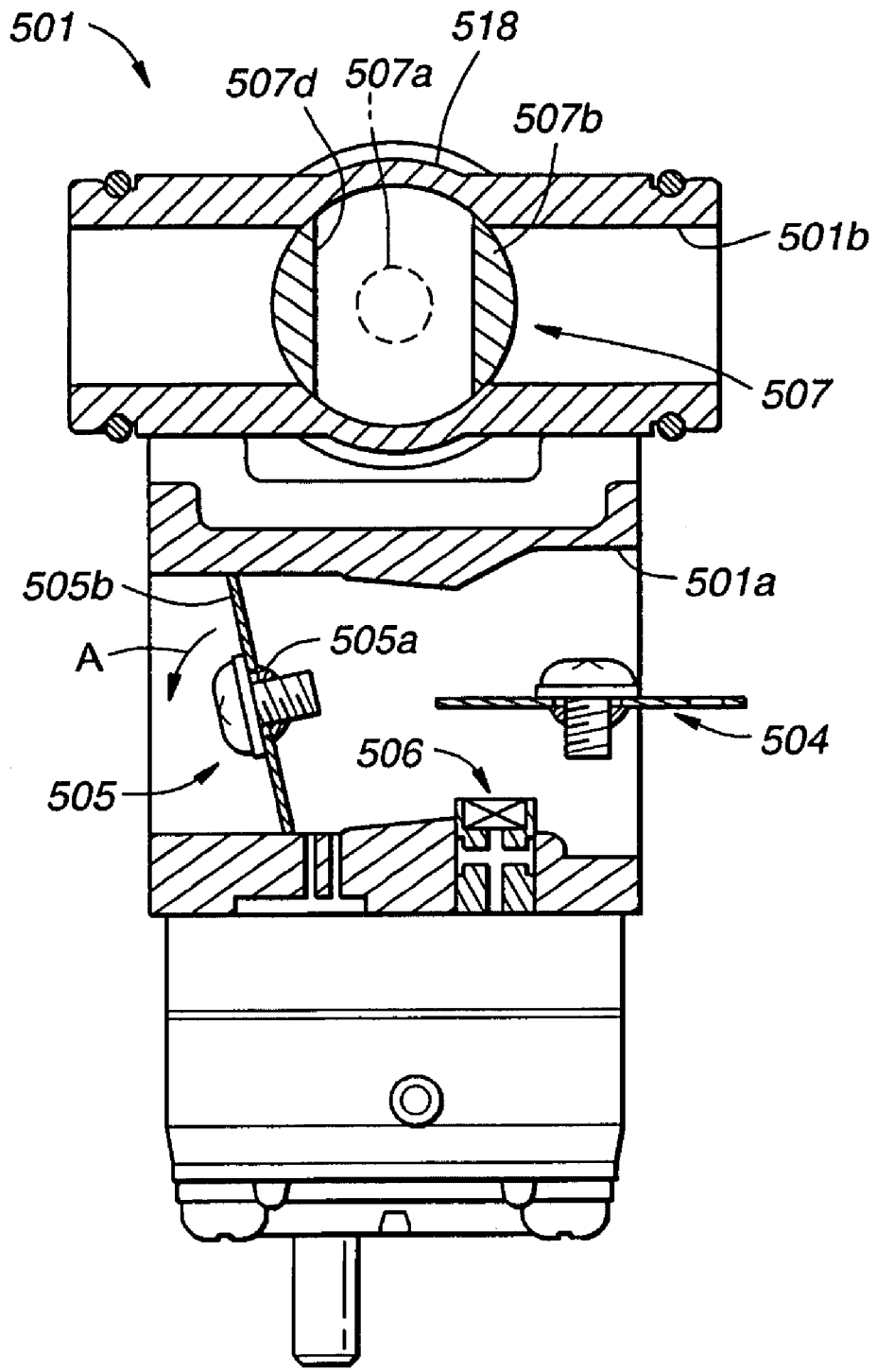
FIG. 23 is a sectional side view of the carburetor of FIG. 19 shown in the fully closed state of the throttle valve.

FIGS. 22 and 23 show the state where the throttle valve 505 and scavenging valve 507 are both fully closed prior to starting the engine 2. FIGS. 22 and 23 correspond to FIGS. 20 and 19, respectively, and the corresponding parts are denoted with like numerals without repeating the description of such parts. In the fully closed state, the valve member 505b of the throttle valve 505 is returned by the spring 517 all the way to the position for closing or shutting off the mixture passage 501a.

FIG. 23 shows the state where the mixture passage 501a is shut off by the valve member 505b, but an idle opening adjustment screw 516 threaded into the carburetor main body as shown in FIGS. 20 and 21 adjustably defines an idle opening angle or position of the throttle valve 505. A tapered surface 516a is formed between a head and threaded part of the idle opening adjustment screw 516, and the arm 508b of the throttle valve lever 508 is engaged by this tapered surface 516a at the idle opening of the throttle valve 505. More specifically, the point of the tapered surface 516a at which the arm 508b is engaged moves in a radial direction as the idle opening adjustment screw 516 is rotated, and this shift in the point of engagement causes a rotation of the arm 508b as indicated by arrow C in FIG. 22 so that the opening angle and open area of the throttle valve 505 changes. The opening angle of the throttle valve 505 at the time of idling can be adjusted in this manner.

In the fully closed state, the engagement pin 510b of the connecting rod 510 is located at the other end (lower end as seen in FIG. 20) of the guide slot 508a opposite from the one end (upper end as seen in FIG. 20) in which the engagement pin 510b engages the guide slot 508a in the fully open state. Therefore, when the valve member 505b is turned toward the fully open position (as indicated by arrow A in FIG. 23) from the fully closed position by operating the throttle lever 514, the throttle valve lever 508 starts turning in the direction indicated by arrow A in FIG. 22. However, until the throttle valve lever 508 has turned by a certain angle, the engagement pin 510b simply travels inside the guide slot 508a in the lengthwise direction thereof toward the one end of the guide slot 508a. Because the scavenging valve shaft 507a and the scavenging valve 507 are yieldably biased toward the fully closed position (as indicated by arrow D in FIG. 22) by the scavenging valve return spring 515, during the time the engagement pin 510b travels inside the guide slot 508a, the scavenging valve 507 remains fully closed.

When the throttle valve lever 508 has turned by the prescribed angle from the fully closed position, the pin 510b comes into engagement with the other end of the guide slot 508a. As the throttle valve 505 is opened further, because the rotation of the throttle valve lever 508 is transmitted to the scavenging valve lever 509 via the connecting rod 510 in this case, the scavenging valve lever 509 turns in the direction opposite to that indicated by arrow D against the spring force of the scavenging valve return spring 515 and this movement opens the scavenging valve 507. The change in the opening angle of the scavenging valve 507 in relation with the opening angle of the throttle valve 505 after the scavenging valve 507 has started opening is determined by the geometry of the synchronizing mechanism, which includes the levers 508 and 509 and the connecting rod 510. The mechanism for synchronizing the opening angles of the scavenging valve 507 and throttle valve 505 is not limited to the illustrated mechanism but may include any suitable transmitting mechanisms including those using gears, timing belts, cams or the like.

Figure 24A:
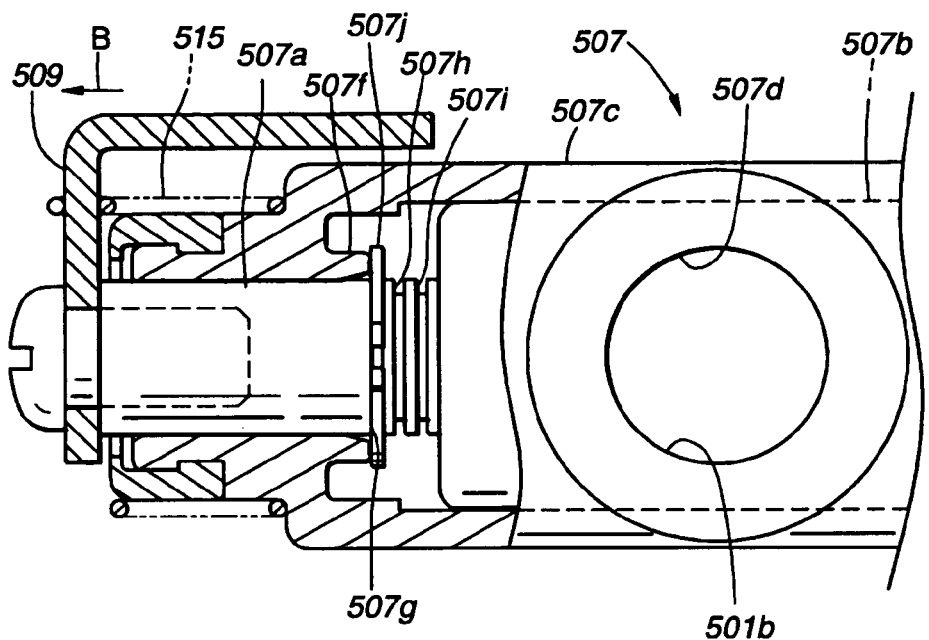
FIG. 24a is a fragmentary sectional view of the carburetor of FIG. 19 showing a state of maximum fluid communication when a scavenging valve is fully open.

FIG. 24a shows the fully open state of the scavenging valve 507. In this state, the air passage 501b and the through hole 507d completely align with each other. As they have the same inner diameter, 100% of the air passage 501 communicates with the through hole 507d for conducting scavenging air.

Figure 24B:
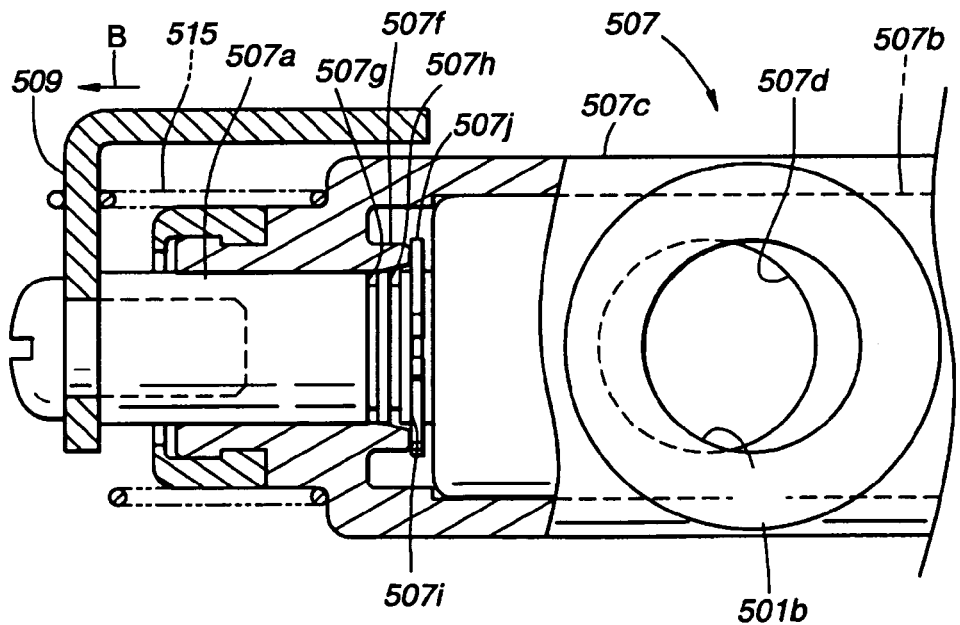
FIG. 24b is a fragmentary sectional view of the carburetor of FIG. 19 showing a state of minimum fluid communication when the scavenging valve is shifted.

When the flow of scavenging air in the fully open state is desired to be reduced so as to match the specifications of a different engine, the clip 507j may be fitted in the second or third circumferential groove 507h or 507i. For example, if the clip 507j is fitted in the third groove 507i, the valve member 507b is displaced by a distance corresponding to the space between the first circumferential groove 507g and the third circumferential groove 507i as compared to the state of full communication illustrated in FIG. 24a so that the overlap between the air passage 501b and the through hole 507d is reduced by a corresponding amount as shown in FIG. 24b, and this reduces the amount of scavenging air.

By providing the three circumferential grooves 507g, 507h, 507i as shown in the drawings, the clip 507j may be fitted in the first circumferential groove 507g when a maximum amount of fluid communication is desired, in the third circumferential groove 507i when a minimum lesser amount of fluid communication is desired, and the second circumferential groove 507h when an intermediate amount of fluid communication is desired. Accordingly, a desired degree of fluid communication can be achieved depending on the specifications of the engine, using the same component parts of the carburetor 501. The number of the circumferential grooves for selectively fitting the clip 507j is not limited to three but may be four or more, and the spacing of these grooves may be freely selected depending on each particular design, and need not be evenly spaced.

Figure 25A:
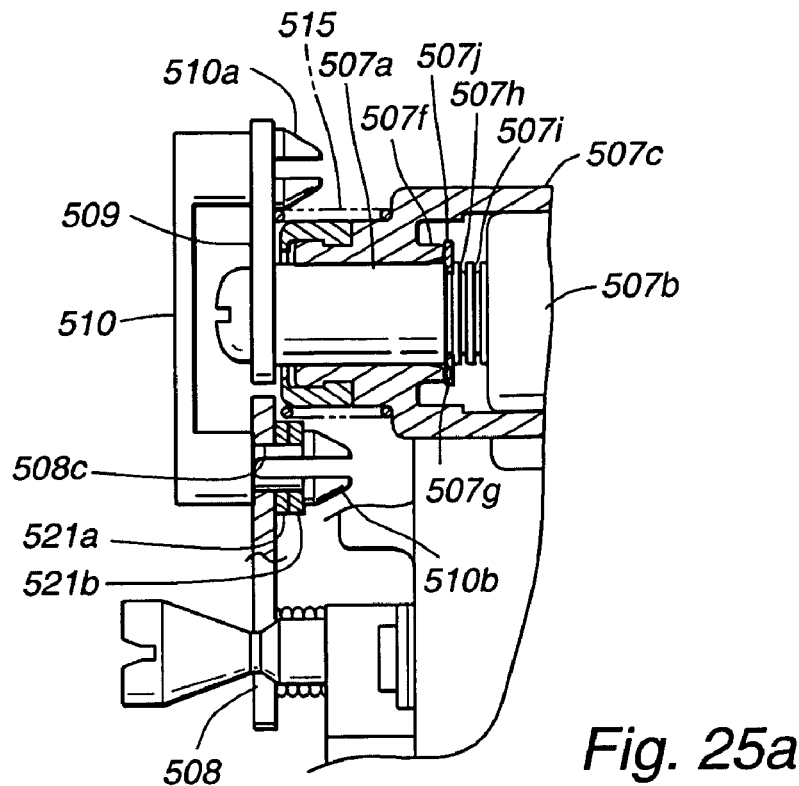
Figure 25B:
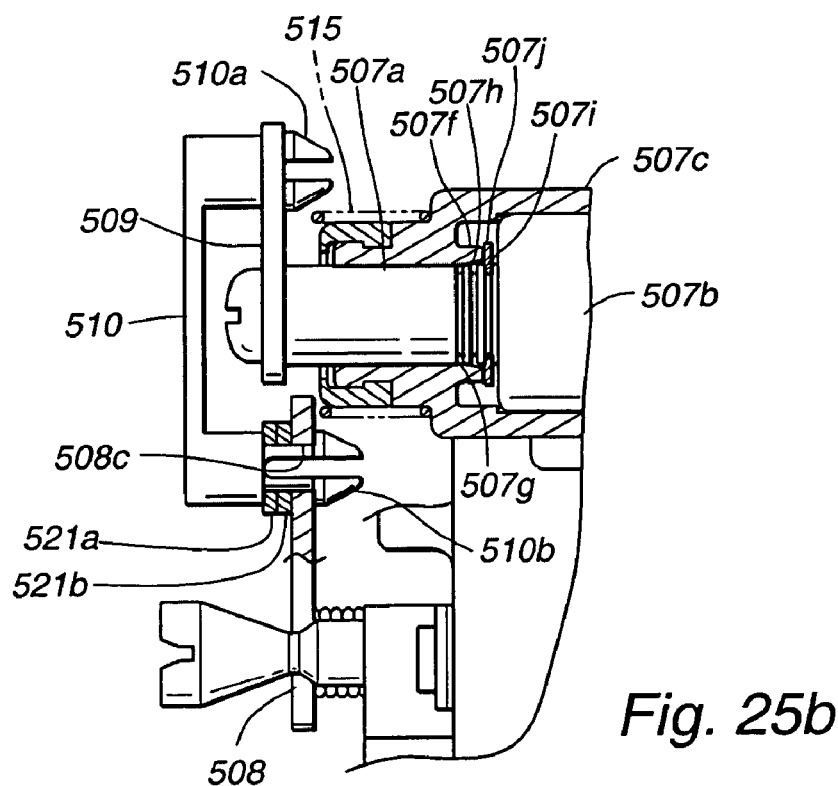
FIG. 25b is a fragmentary sectional view of the carburetor of FIG. 19 showing how the first lever of the synchronizing mechanism is connected to the connecting rod and in the state of minimum fluid communication of FIG. 24b.

As shown in FIGS. 25a and 25b, the connecting rod 510 moves in the direction of the axes of the scavenging valve shaft 507a relative to the first throttle valve lever 508 to the same extent as the scavenging valve shaft 507a moves in the axial direction. Accordingly, each pin 510a or 510b remains coaxial with respect to the pivot hole of the corresponding lever 508 or 509 without regard to the axial displacement of the connecting rod 510 resulting from the axial displacement of the scavenging valve shaft 507a. Accordingly, the pin 510b connected to the throttle valve lever 508 is provided with a predetermined length so that a pair of flat washers 521a and 521b, which have a combined thickness corresponding to the axial displacement of the scavenging valve shaft 507b, may be fitted on the pin 510b. The two pins 510a and 510b may have similar shape, and may include a large diameter portion formed on one side of the connecting rod 510, a coaxial stem portion of a smaller diameter, and a coaxial enlarged tapered head on an opposite side of the connecting rod 510. As represented by the illustrated structure associated with the throttle valve lever 508, the pin 510b may include two split fingers or halves so that the enlarged tapered head of the pin 510b may be passed through the pivot hole 508c of the throttle valve lever 508 and the stem portion may be pivotally supported by the pivot hole 508c.

In the state of maximum fluid communication illustrated in FIGS. 24a and 25a, the throttle valve lever 508 and the scavenging valve lever 509 are substantially aligned along a common plane, and the flat washers 521a and 521b are fitted between the head of the pin 510b and the throttle valve lever 508.

In the state of minimum fluid communication illustrated in FIGS. 24b and 25b, the scavenging valve lever 509 is displaced away from the carburetor main body in relation to the throttle valve lever 508, such that the levers 508 and 509 are not aligned along the same plane. Also, the head of the pin 510b is engaged by the throttle valve lever 508, and the flat washers 521a and 521b are interposed between the shoulder defined by the large diameter portion of the connecting rod 510 and the throttle valve lever 508. Accordingly, the levers 508 and 509 and the connecting rods 510 can be maintained in parallel relationship to each other.

In the state of intermediate fluid communication (not shown), the flat washers 521a and 521b may be placed on opposite sides of the throttle valve lever 508. Although a pair of flat washers 521a and 521b are shown, collars having different lengths may be used so that a collar having an appropriate length may be interposed depending on the desired degree of fluid communication. Also, the length of the stem portion of the pin 510b may be made equal to that of the other pin 510a. In such a case, the main part (bar portion) of the connecting rod 510 may be bent so as to accommodate any axial offset of the scavenging valve lever 509 from the throttle valve lever 508.

The adjustment mechanism for positioning the valve member 507 is not limited to the one shown in the illustrated form. For instance, the circumferential grooves for engaging the clip 507j may be formed not only in the (inner) part of the scavenging valve shaft 507b as shown in the illustrated form but also in an outer part of the scavenging valve shaft 507b extending out of the valve ease 507c. Also, the scavenging valve return spring 515 of the scavenging valve lever 509 was used additionally for the purpose of yieldably biasing and axially positioning the scavenging valve shaft 507a of the valve member 507b, but the scavenging valve return spring 515 may also be used solely for restoring the scavenging valve lever 509 to the rest position while a separate compression coil spring (not shown) disposed coaxially with respect to the scavenging valve return spring 515 is used for yieldably biasing the scavenging valve shaft 507a in the axial direction.

By using the adjustable scavenging valve arrangements described above, a plurality of kinds of valve members having through holes of different diameters are not required and the number of component parts is not required to be increased even when the carburetor is required to be adapted to a plurality of engine models. In other words, the number of component parts can be reduced as compared to conventional arrangements.

Thus, according to the present description, the scavenging valve 507 preferably includes a plug-type valve having the cylindrical valve member 507b supported in an axially movable manner. Therefore, the degree of communication between the air passage 501b and the through hole 507d of the valve member 507b in the fully open state of the scavenging valve 507 can be adjusted by changing the axial position of the valve member 507b and the combined opening area of these two holes 501b, 507d can be freely selected by changing the axial position of the valve member 507b. This allows the amount of scavenging air to be changed so as to adapt the carburetor 501 to different engine models simply by changing the axial position of the valve member 507d, and eliminates the need to stock different component parts for different engines and contributes to the reduction in manufacturing costs.

Sixth Form

FIGS. 26 through 34b illustrate another presently preferred sixth form of a scavenging carburetor 601 that is of more compact design compared to the previous forms. This form is similar in many respects to the forms of FIGS. 1 through 25b, and like numerals between the forms generally designate like or corresponding elements throughout the several views of the drawing figures. Additionally, the description of the common subject matter may generally not be repeated here.

The previously described forms provides a carburetor having a scavenging valve that provides variable fluid communication therethrough. However, a cylindrical valve member of the scavenging valve requires a cylindrical case that bulges out from the carburetor main body. But, when the carburetor is used with some products such as a chainsaw, a compact design is highly desirable. The scavenging carburetor 601, however, provides a more compact design.

The carburetor 601 is adapted to be used in a scavenging two-stroke internal combustion engine, and includes a mixture passage 601a for supplying mixture to the engine 2 and an air passage 601b for supplying scavenging air to the engine 2. These two passages 601a and 601b extend generally parallel to each other, and the upstream ends thereof preferably are connected to an air cleaner 3.

The mixture passage 601a is provided with a choke valve 604 and a throttle valve 605, in that order from the upstream end. A fuel nozzle 606 is disposed between these valves. The air passage 601b has a circular cross section, and is provided with a scavenging valve 607. As shown in the drawing, the throttle valve 605 includes a butterfly valve including a throttle valve shaft 605a extending diametrically across the mixture passage 601a and a disk-shaped valve member 605b fixedly attached-to the valve shaft 605a. The scavenging valve 607 preferably includes a rotary plug-type valve including a cylindrical valve member 607b extending transversely across the air passage 601b and an integral valve shaft 607a extending parallel to the throttle valve shaft 605. The cylindrical valve member 607b is provided with a transverse through hole 607d so that the air passage 601b may be opened and closed depending on the angular position of the valve member 607b.

Figure 27:
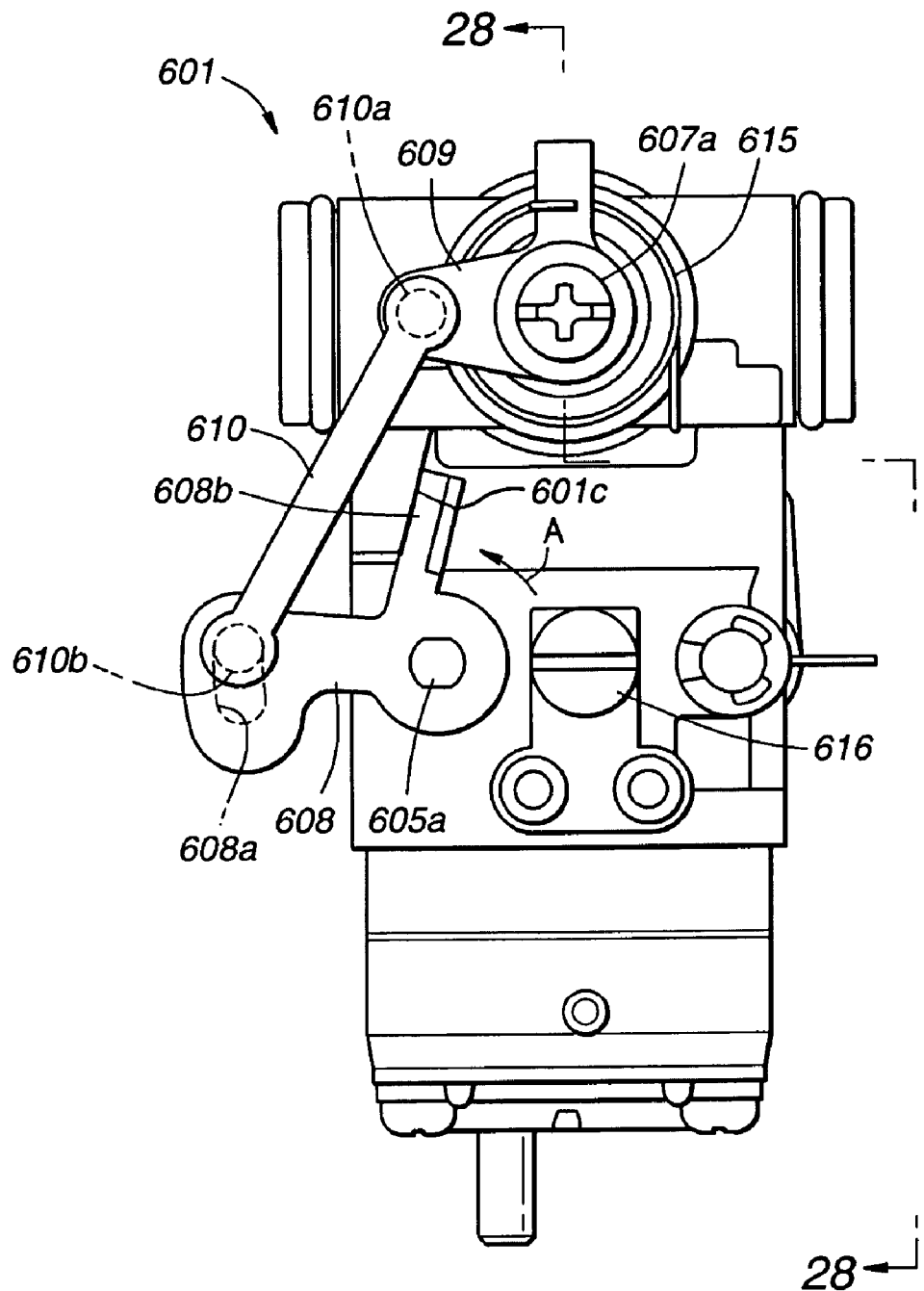
FIG. 27 is a side view of the carburetor of FIG. 26 including a synchronizing mechanism shown in the fully open state of the throttle valve.
Figure 28:
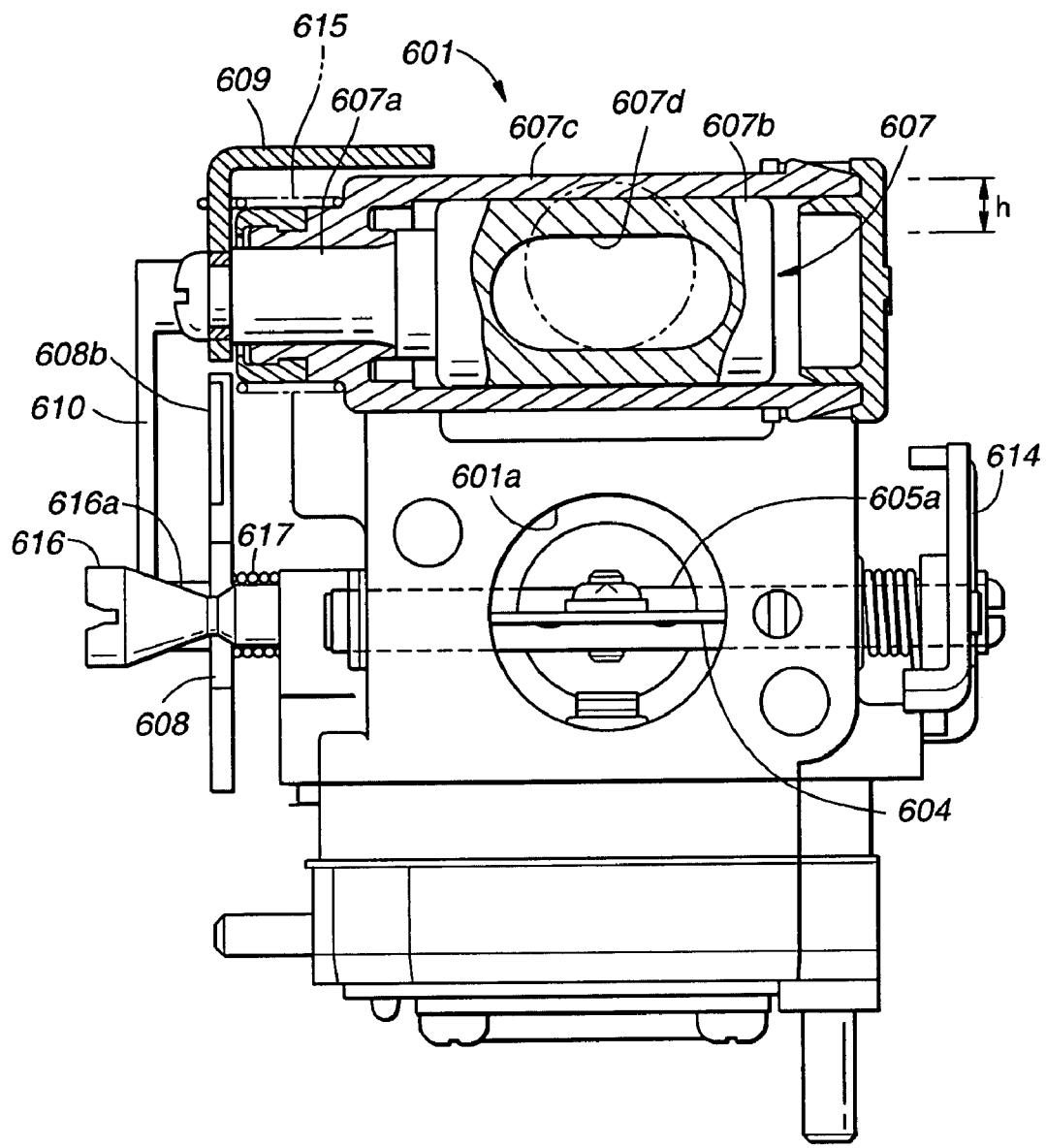
FIG. 28 is a cross-sectional view taken along line 28-28 in FIG. 27.

As shown in FIGS. 27 and 28, the axes of the throttle valve shaft 605a and valve shaft 607a extend generally parallel to each other and one above the other. The axial ends of the throttle valve shaft 605a and valve shaft 607a project outward from a same side of the carburetor 601. The projecting end of the throttle valve shaft 605a fixedly carries a throttle valve lever 608 extending radially outward, and the projecting end of the scavenging valve shaft 607a likewise fixedly carries a scavenging valve lever 609 extending radially outward. The throttle valve lever 608 is connected to the scavenging valve lever 609 via a connecting rod 610.

One end of the connecting rod 610 is rotatably connected to the scavenging valve lever 609 via a pin 610a provided on the one end of the connecting rod 610. As shown in FIG. 27, the throttle valve lever 608 is generally L-shaped. One end of the throttle valve lever 608 is formed with a non-circular passage into which the throttle valve shaft 605a fits. At another end of the throttle valve lever 608, engagement pin 610b of the connecting rod 610 is slidably received in an arcuate guide slot 608a so as to be movable within the guide slot 608a. In this way, the connecting rod 610 is connected to the throttle valve lever 608 in such a manner that lost motion is provided with respect to the rotational direction of the throttle valve lever 608.

Figure 26:
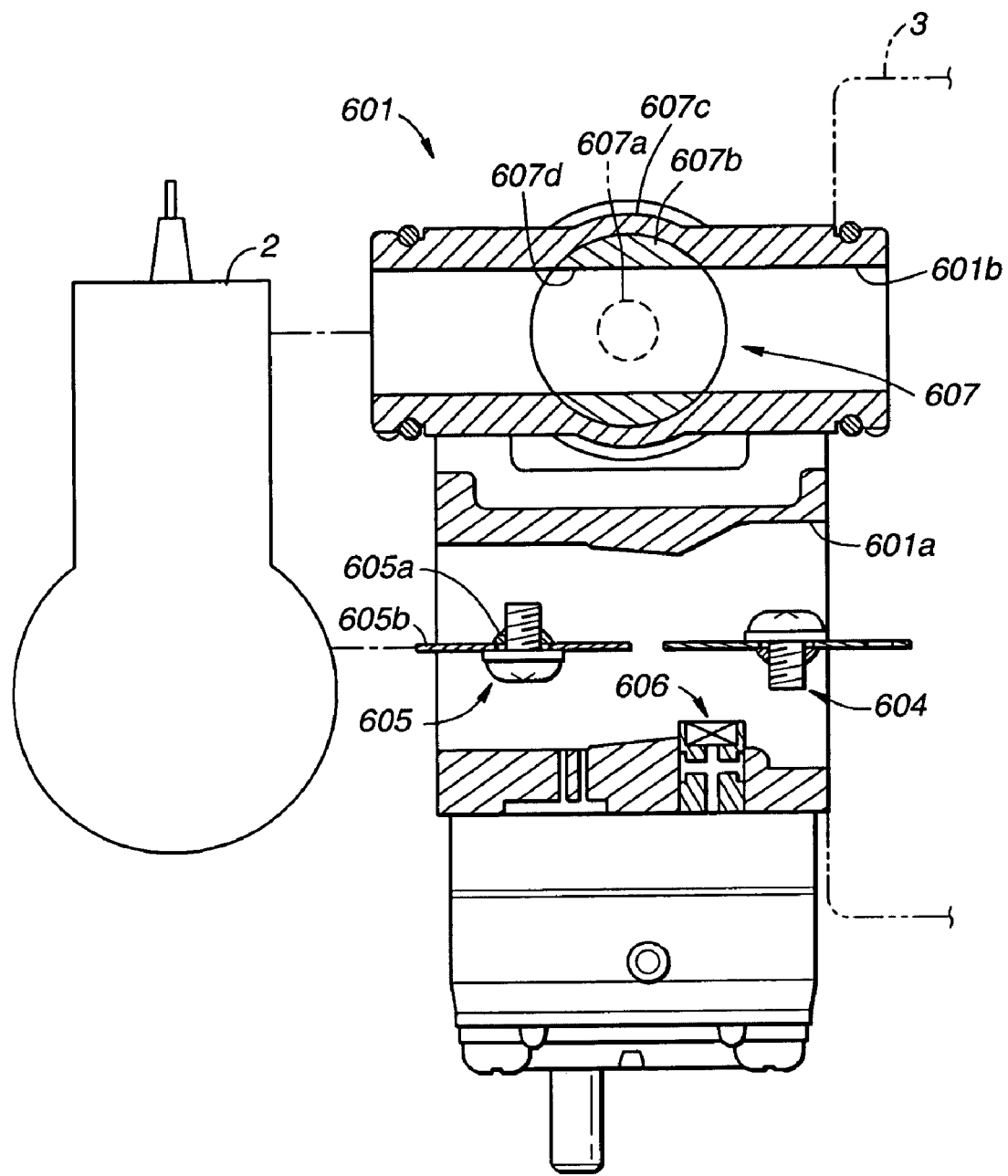
FIG. 26 is a fragmentary sectional side view of a sixth form of a scavenging carburetor, shown in a fully open state of a throttle valve.

FIGS. 26 through 28 show the fully open state of the throttle valve 605. In the state illustrated in FIGS. 26 through 28, an arm 608b extends radially outward from the throttle valve lever 608 and is engageable by a stopper 601c protruding from the main body of the carburetor 601. The throttle valve lever 608 rotates in the direction indicated by arrow A from the fully closed position until the arm 608b is engaged by the stopper 601c.

As shown in FIG. 28, an opposite axial end of the throttle valve shaft 605a of the throttle valve 605 projects out of the other side of the carburetor 601, and carries a throttle lever 614 to which an actuator wire of a remote control cable (not shown) is connected. The part of the throttle valve shaft 605a projecting from the carburetor main body toward the throttle valve lever 608 is provided with a return spring 617 for yieldably biasing the throttle valve shaft 605a toward the fully closed position. Between the scavenging valve lever 609 and the valve case 607c is interposed a scavenging valve return torsion spring 615 for yieldably biasing the scavenging valve shaft 607a of the scavenging valve 607 toward the fully closed position which shuts off the air passage 601b. The spring 615 may also function as a compression coil spring.

Figure 29:
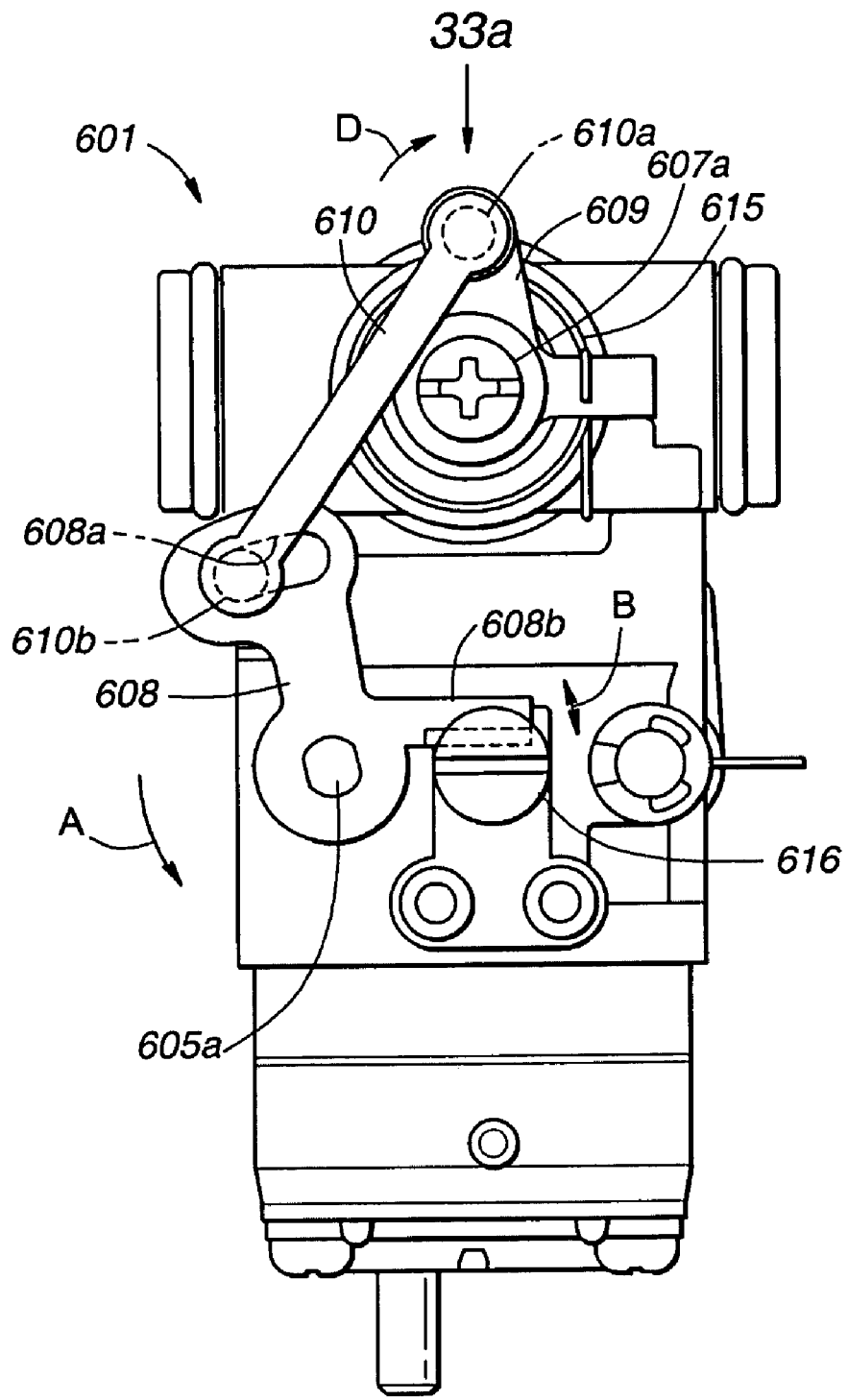
FIG. 29 is a side view of the carburetor of FIG. 26 including the synchronizing mechanism shown in a fully closed state of the throttle valve.
Figure 30:
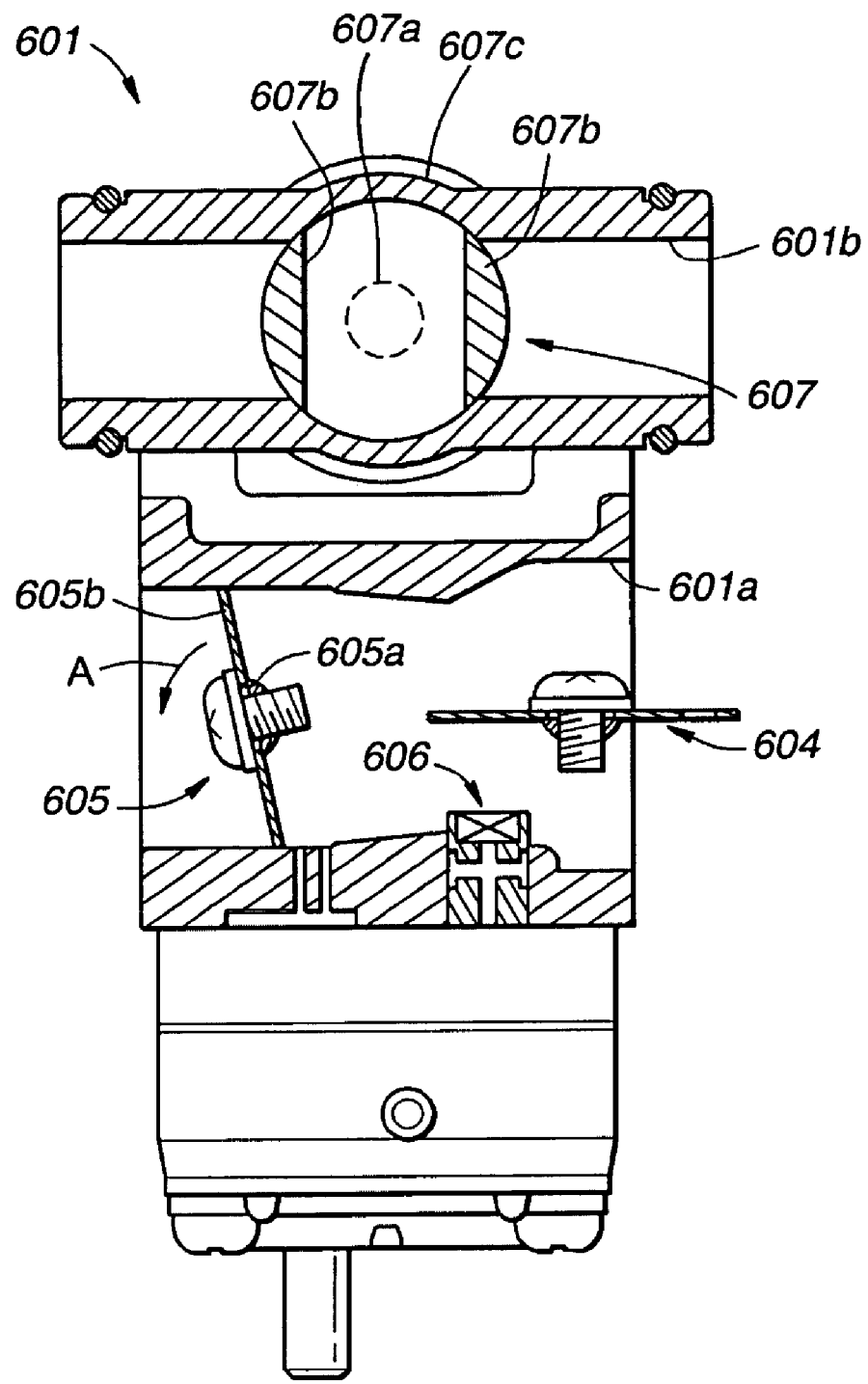
FIG. 30 is a fragmentary sectional side view of the carburetor of FIG. 26 shown in the fully closed state of the throttle valve.

FIGS. 29 and 30 show the state where the throttle valve 605 and scavenging valve 607 are both fully closed prior to starting the engine. FIGS. 29 and 30 correspond to FIGS. 27 and 26, respectively, and the corresponding parts are denoted with like numerals without repeating the description of such parts.

In the fully closed state, the valve member 605b of the throttle valve 605 is returned by spring 617 all the way to the position shutting off the mixture passage 601a. FIG. 30 shows the state where the mixture passage 601a is shut off by the valve member 605b, but an idle opening adjustment screw 616 threaded into a prescribed part of the carburetor main body as shown in FIGS. 27 and 28 adjustably defines an idle opening angle and open area of the throttle valve 605.

A tapered surface 616a is formed between a head and threaded part of the idle opening adjustment screw 616, and the arm 608b of the throttle valve lever 608 is engaged by this tapered surface 616a at the idle opening of the throttle valve 605. More specifically, the point of the tapered surface 616a at which the arm 608b is engaged moves in a radial direction as the idle opening adjustment screw 616 is turned, and this shift in the point of engagement causes a rotation of the arm 608b as indicated by arrow B in FIG. 29 so that the opening angle and open area of the throttle valve 605 changes. The opening angle and open area of the throttle valve 605 at the time of idling can be adjusted in this manner.

In the fully closed state, the engagement pin 610b of the connecting rod 610 is located at the other end (lower end as seen in FIG. 27) of the guide slot 608a opposite from the one end (upper end as seen in FIG. 27) at which the engagement pin 610b engages the guide slot 608a in the fully open state. Therefore, when the valve member 605b is turned toward the fully open position (as indicated by arrow A in FIG. 30) from the fully closed position by operating the throttle lever 614, the throttle valve lever 608 starts turning in the direction indicated by arrow A in FIG. 29. However, until the throttle valve lever 608 has turned by a certain angle, the engagement pin 610b simply travels inside the guide slot 608a in the lengthwise direction thereof toward the one end of the guide slot 608a. Because the scavenging valve shaft 607a of the scavenging valve 607 is yieldably biased toward the fully closed position (as indicated by arrow D in FIG. 29) by the scavenging valve return spring 615, during the time the engagement pin 610b travels inside the guide slot 608a, the scavenging valve 607 remains fully closed.

Figure 31:
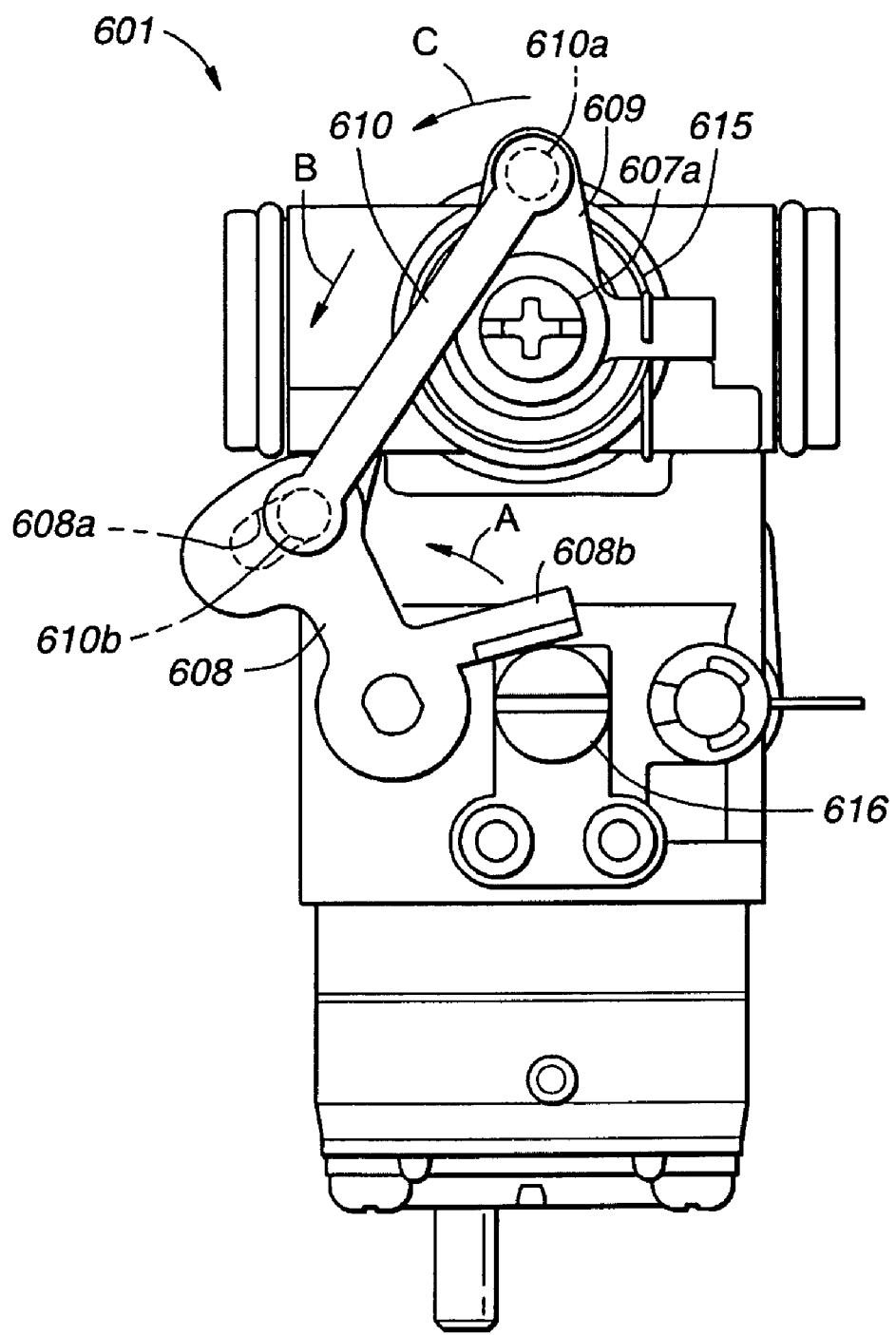
FIG. 31 is a side view of the carburetor of FIG. 26 shown in a state wherein an opening angle of the throttle valve is about 30 degrees.
Figure 32:
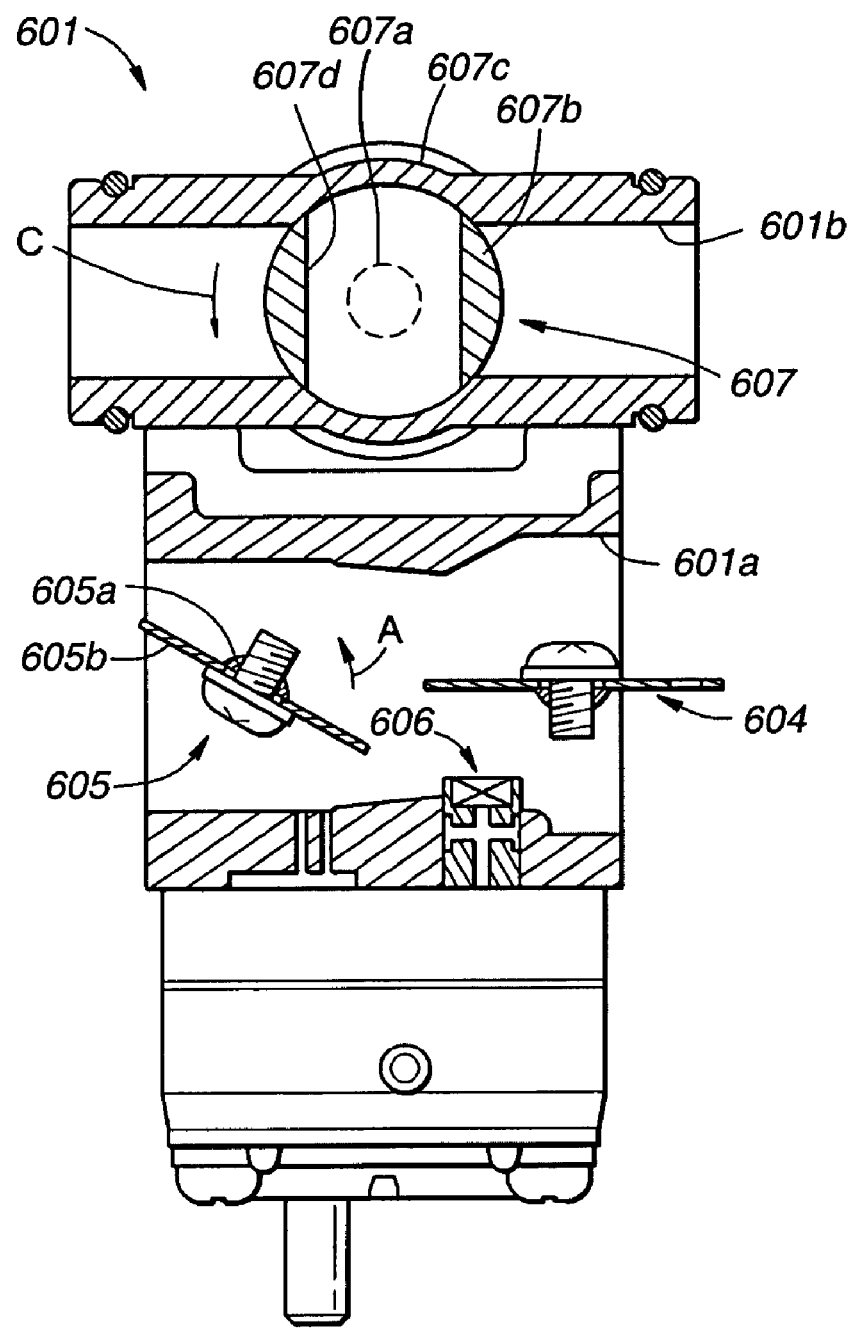
FIG. 32 is a fragmentary sectional side view of the carburetor of FIG. 26 shown in the state of FIG. 31.

But when the throttle valve lever 8 has rotated through about 30-35 degrees, for instance, from the fully closed position, the engagement pin 610b comes into engagement with the other end of the guide slot 608a to achieve the state illustrated in FIG. 31. FIG. 32 shows the states of the two valves 605 and 607 at this point. As the throttle valve 605 is opened further, because the rotation of the throttle valve lever 608 causes the connecting rod 610 to be moved in the direction indicated by arrow B in FIG. 31, the scavenging valve lever 609 is turned in the direction indicated by arrow C against the spring force of the scavenging valve return spring 615, and this opens the scavenging valve 607. The change in the opening angle of the scavenging valve 607 in relation with the opening angle of the throttle valve 605 after the scavenging valve 607 has started opening is determined by the geometry of the synchronizing mechanism including the levers 608 and 609 and the connecting rod 610. The mechanism for synchronizing the opening angles of the scavenging valve 607 and throttle valve 605 is not limited to the illustrated mechanism but may include any suitable transmitting mechanisms including those using gears, timing belts, cams or the like.

In the scavenging valve 607, the through hole 607d of the cylindrical valve member 607b communicating with the air passage 601b is provided with a cross section which is elongated along the axial direction of the cylindrical valve member 607b, as illustrated in FIG. 28. Because the through hole 607d is elongated and distributed over a relatively greater length of the cylindrical valve member 607b, the radial dimension of the cylindrical valve member 607b can be reduced, as compared to a valve member formed with a through hole having a circular cross section as indicated by phantom line in the drawing, so that the vertical dimension of the carburetor 601 can be reduced by dimension h.

In a scavenging carburetor provided with the throttle valve 605 and the scavenging valve 607 that are arranged generally in parallel to each other as in the illustrated FIG. 28, the spacing between the two valves 605 and 607 cannot be reduced beyond a certain limit because of various restrictions on the surrounding structure. However, when the through hole 607d is provided with a cross section which is elongated along the axial direction of the valve member 607b as discussed above, the dimension of the carburetor 601 in the vertical direction along which the two valves are arranged can be minimized. A carburetor constructed in this manner is highly suitable for use in engine chainsaws and other applications where a compact design is highly desirable.

Figure 33A:
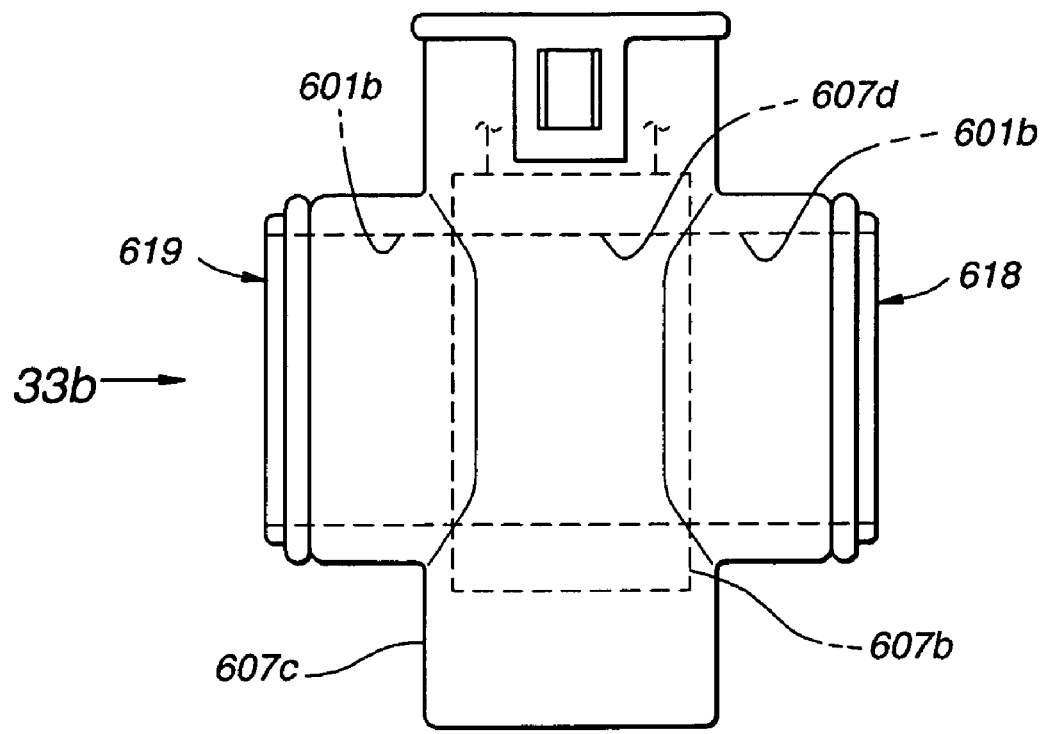
FIG. 33a is a fragmentary top view of a valve case of the carburetor of FIG. 26 as viewed from the direction indicated by arrow 33a in FIG. 29.
Figure 33B:
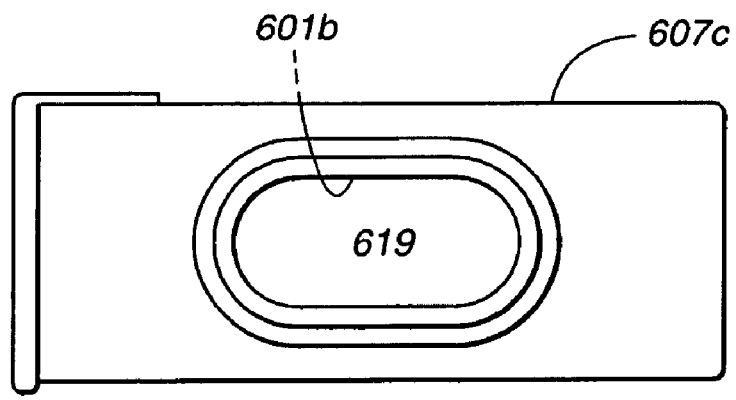

FIG. 33a is a top view of the rotary valve case 607c. As shown in the drawing, the valve member 607b extends across an intermediate part of the air passage 601b, and the upstream and downstream ends of the air passage 601b are communicated with each other via the through hole 607d of the valve member 607b. The upstream end of the air passage 601b defines an air inlet port 618 preferably connected to the air cleaner 603 and the downstream end thereof defines an air outlet port 619 connected to the engine 602. The cross-sectional shapes of the inlet port 618 and outlet port 619 may be identical to each other, and may be identical to the elongated cross-sectional shape of the through hole 607d as shown in FIG. 33b illustrating the air outlet port 619.

The cross-sectional shape of the through hole 607d may include any elongated shapes such as an oval shape as defined by a mutually separated semi-circles that are connected to each other by a pair of parallel lines, an elliptic shape, or a rectangular shape, or the like. The port on the side of the engine 602 is not required to be provided with the same cross-sectional shape.

Figure 34A:
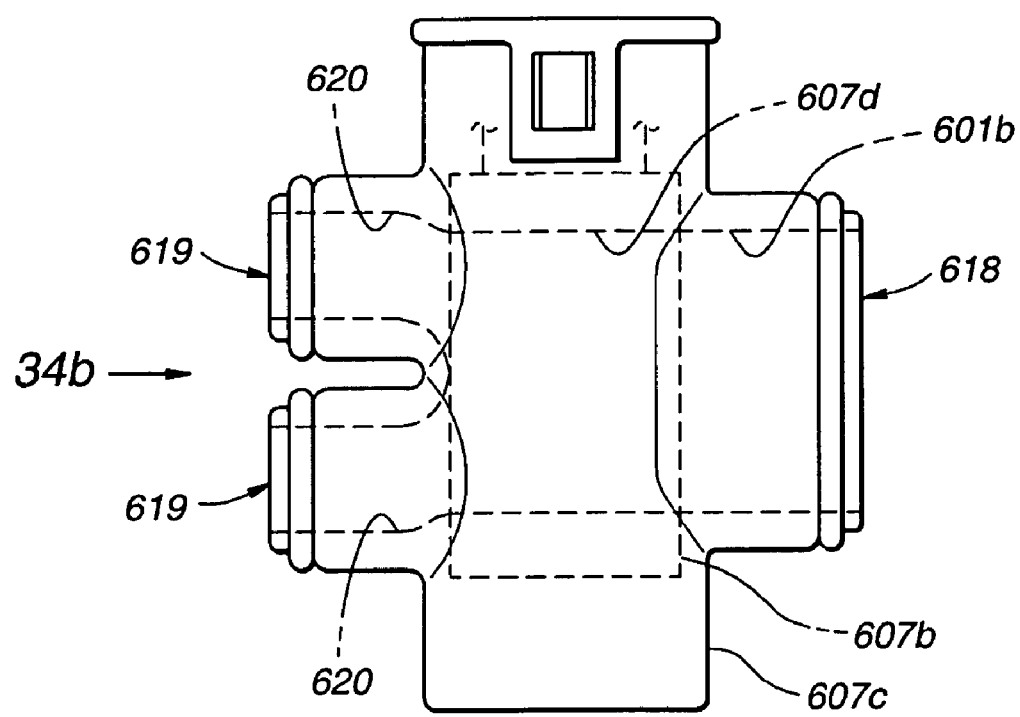
Figure 34B:
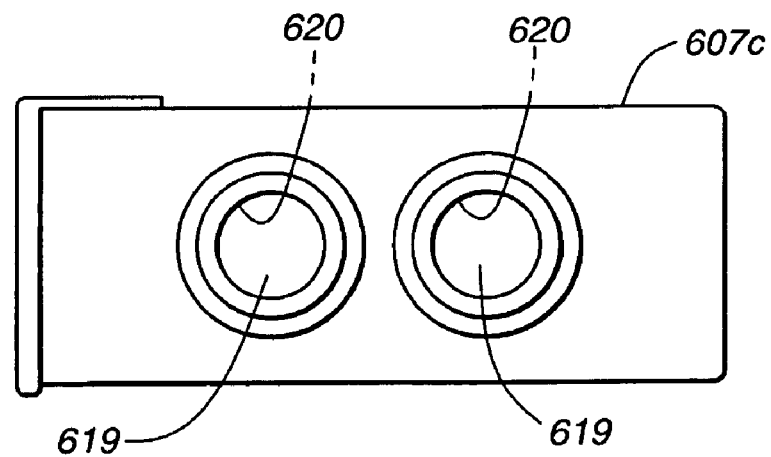

For instance, as illustrated in FIGS. 34a and 34b, the air inlet port 618 of the air passage 601b may have the same cross-sectional shape as the through hole 607d, but the part of the air passage 601b downstream of the through hole 607d on the side of the engine 602 may include a pair of branch passages 620. By so doing, the carburetor 601 can be directly connected to an engine having a pair of scavenging ports without using an adapter that branches out from a single inlet port to a pair of outlet ports.

This can be readily implemented in a carburetor that uses an valve 607 including a rotary plug-type valve including a cylindrical valve member 607b formed with an axially elongated through hole 607d. More specifically, when a pair of air outlet ports 619 are assigned to the axially elongated through hole 607b, the branched passages 620 can be formed without any difficulty or any inconveniences. On the other hand, when the branch passages 620 are to extend from a through hole having a circular cross section, the branch passages 620 have to be laterally diverged to a greater extent, and this would increase the flow resistance. An increase in flow resistance can be avoided if the passages are allowed to curve gradually, but it would increase the length of the air passages, and this prevents a compact design. The present form eliminates such a problem. The flow of air may be slightly obstructed because of the reduction of the combined cross-sectional area of the outlet ports as compared with that of the air inlet port 618, but it is still possible to supply an adequate amount of air to each of the branch passages.

Thus, according to the present form, because the cross-sectional area of air passage 607d formed in the valve 607b is elongated and distributed over a relatively greater length of the valve 607b, the radial dimension of the valve member 607b can be reduced while ensuring the same cross-sectional area for scavenging air flow, as compared to the arrangement where the through hole is provided with a circular cross section. In other words, by providing the through hole of the valve member with an elongated cross section, the diameter of the cylindrical valve member can be minimized while ensuring a suitable cross-sectional area of the through hole. Accordingly, the size of a carburetor can be reduced. The cross-sectional shape of the through hole may include any elongated shapes such as an oval shape, an elliptic shape, rectangular shape, or the like.

By branching the air passage adjacent to the engine into a plurality of branch passages corresponding to the number of scavenging ports of the engine, the side of the carburetor facing the engine may be provided with a plurality of ports so that an adapter for branching out the passage is not required to be interposed between the carburetor and engine. Thereby, the number of component parts can be reduced, and an even more compact design is possible.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the forms or embodiments thereof, the articles "a," "an," "the," and "said" are intended to mean that there are one or more of the elements.

It is to be understood that the invention is not limited to the particular exemplary forms or embodiments disclosed herein, but rather is defined by the claims below. In other words, the statements contained in the foregoing description relate to particular exemplary forms or embodiments and are not to be construed as limitations on the scope of the invention as claimed below or on the definition of terms used in the claims, except where a term or phrase is expressly defined above or where the statement specifically refers to "the invention."

Although the present invention has been disclosed in conjunction with a limited number of presently preferred exemplary forms or embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. Indeed, the present invention is intended to embrace all such forms, ramifications, modifications, variations, substitutions, and/or equivalents as fall within the spirit and broad scope of the following claims.

What is claimed is:

1. A scavenging carburetor, comprising:
   a fuel-and-air mixture passage;
   a throttle valve including a butterfly valve that opens and closes the mixture passage;
   a scavenging air passage;
   a scavenging plug valve that opens and closes the scavenging air passage; and
   a synchronizing mechanism provided between the throttle valve and scavenging valve to open and close the valves in synchronism.

2. The scavenging carburetor of claim 1, wherein the axis of a support shaft of the butterfly valve extends parallel with the axis of a support shaft of the plug valve.

3. The scavenging carburetor of claim 1, wherein the plug valve is adapted to start opening the air passage when the plug valve has rotated by more than a prescribed angle from a fully closed position.

4. The scavenging carburetor of claim 3, wherein the scavenging valve includes a bore therethrough that is smaller in size than the scavenging air passage.

5. The scavenging carburetor of claim 3, wherein the synchronizing mechanism includes a lost motion mechanism.

6. The scavenging carburetor of claim 1, wherein the synchronizing mechanism includes levers attached to support shafts of the valves that are connected to each other by a connecting rod.

7. The scavenging carburetor of claim 1, wherein the synchronizing mechanism includes:
   a first throttle valve lever connected to a throttle valve shaft supporting the butterfly valve;
   a second throttle valve lever rotatably supported by the throttle valve shaft in a coaxial manner;
   a scavenging valve lever connected to a scavenging valve shaft supporting the scavenging valve;
   a connecting rod connecting the second throttle lever to the scavenging valve lever;
   an opening angle adjustment device provided between the first throttle valve lever and second throttle valve lever to define a prescribed opening angle of the throttle valve at which the scavenging valve starts opening; and
   a return spring that yieldably biases the scavenging valve lever toward a position to fully close the scavenging valve.

8. The scavenging carburetor of claim 7, wherein the opening angle adjustment device includes an adjustment screw threadably supported by the first throttle valve lever so as to engage the second throttle valve lever and transmit the rotation of the first throttle valve lever to the second throttle valve lever in an adjustable manner.

9. The scavenging carburetor of claim 1, comprising:
   a carburetor body;
   a cylindrical support hole formed in the carburetor body so as to extend across the scavenging air passage;
   the scavenging plug valve comprises a cylindrical valve member coaxially and rotatably supported in the support holes, a through hole passed diametrically through the cylindrical valve member, and the cylindrical valve member being axially movable in the support hole so that a degree of communication between the scavenging air passage and the through hole in a fully open state of the scavenging valve may be adjusted; and the carburetor further comprising an adjustment mechanism to allow the cylindrical valve member to be axially positioned in the support hole at a desired position.

10. The scavenging carburetor of claim 9, wherein the adjustment mechanism includes:
a plurality of circumferential grooves formed around a valve shaft coaxially provided on the cylindrical valve member;
an engagement member selectively engageable with a selected one of the circumferential grooves and projecting radially outward of the valve shaft;
a yieldable biasing member to yieldably bias the cylindrical valve member in an axial direction; and
a stopper portion formed on the carburetor body for retaining the engagement member against a biasing force of the yieldable biasing member.

11. The scavenging carburetor of claim 1, wherein the scavenging plug valve includes a valve member formed with a through hole extending laterally through the valve member and having a cross section elongated in an axial direction of the valve member.

12. The scavenging carburetor of claim 11, wherein an end of the air passage adjacent to the engine is branched into a plurality of branch passages corresponding in number to scavenging ports of the engine and which are arranged along the axial direction of the valve member.

13. A scavenging carburetor, comprising:
a fuel-and-air mixture passage;
a throttle valve including a butterfly valve that opens and closes the mixture passage;
a throttle valve shaft supporting the throttle butterfly valve;
a scavenging air passage;
a scavenging plug valve that opens and closes the scavenging air passage;
a scavenging valve shaft supporting the scavenging plug valve; and
an adjustable synchronizing mechanism provided between the throttle valve and the scavenging plug valve to open and close the valves in synchronism.

14. The scavenging carburetor of claim 13, wherein the adjustable synchronizing mechanism includes:
a first throttle valve lever connected to the throttle valve shaft;
a second throttle valve lever rotatably supported by the throttle valve shaft;
a scavenging valve lever connected to the scavenging valve shaft;
a connecting rod connecting the second throttle valve lever to the scavenging valve lever;
an adjustment device provided between the first and second throttle valve levers to define a predetermined opening angle of the throttle valve at which the scavenging valve starts opening; and
a return spring that yieldably biases the scavenging valve lever toward a position to fully close the scavenging valve.

15. The scavenging carburetor of claim 14, wherein the adjustment device comprises an adjustment screw threadably supported by the first throttle valve lever so as to engage the second throttle valve lever and transmit the rotation of the first throttle valve lever to the second throttle valve lever in an adjustable manner.

16. The scavenging carburetor of claim 15, further comprising an idle opening adjustment screw threaded into a portion of the carburetor and including a tapered surface to engage a portion of the first throttle valve lever which moves as the idle opening adjustment screw is turned so as to adjust the opening angle of the throttle valve during engine idling.

17. A scavenging carburetor, comprising:
a fuel-and-air mixture passage;
a throttle a butterfly valve that opens and closes the mixture passage;
a scavenging air passage; and
a scavenging plug valve that opens and closes the scavenging air passage, wherein the scavenging plug valve includes:
a cylindrical support hole formed in a body of the carburetor so as to extend across the scavenging air passage;
a cylindrical valve member coaxially and rotatably supported in the support hole, a through hole passed diametrically across the cylindrical valve member, and the cylindrical valve member being axially movable in the support hole so that a degree of communication between the air passage and the through hole in a fully open state of the valve may be adjusted; and
an adjustment device for allowing the cylindrical valve member to be axially positioned in the support hole at a desired position.

18. The scavenging carburetor of claim 17, wherein the adjustment device includes:
a valve shaft extending from the cylindrical valve member;
a plurality of circumferential grooves formed around the valve shaft;
an engagement member selectively engageable with a selected one of the circumferential grooves and projecting radially outward of the valve shaft;
a yieldable biasing member yieldably biasing the valve member in an axial direction; and
a stopper portion formed on the carburetor body for retaining the engagement member against a yieldable biasing force of the yieldable biasing member.

19. A scavenging carburetor, comprising:
a fuel-and-air mixture passage;
a throttle butterfly valve that opens and closes the mixture passage;
a scavenging air passage; and
a scavenging plug valve that opens and closes the scavenging air passage, wherein the scavenging plug valve includes a valve member formed with a through hole extending laterally across the valve member and having a cross section elongated in an axial direction of the valve member.

20. The scavenging carburetor of claim 19, wherein an end of the air passage adjacent to the engine is branched into a plurality of branch passages corresponding in number to scavenging ports of the engine and which are arranged along the axial direction of the valve member.

21. A scavenging carburetor arranged for use with a scavenging engine, comprising:
a main body having a fuel-and-air mixture passage therethrough;
a scavenging body carried by the main body and having a scavenging air passage therethrough that is spaced apart from and substantially parallel to the mixture passage;
a throttle butterfly valve that opens and closes the mixture passage;
a scavenging plug valve that opens and closes the scavenging air passage; and
a synchronizing mechanism provided between the throttle valve and scavenging plug valve to open and close the valves in synchronism;

wherein the throttle valve demonstrates a relatively large change in opening area over a relatively small opening angle range and a relatively small change in opening area over a relatively large opening angle range, whereas the scavenging valve demonstrates a relatively small change in opening area over a relatively small opening angle range and a relatively large change in opening area over a relatively large opening angle range, whereby supply of scavenging air is minimized over a low speed range of the engine so as to achieve a stable low speed operation and a stable acceleration, and a relative large amount of scavenging air is supplied over a high speed range of the engine for a given amount of fuel-and-air mixture that is supplied.

22. The scavenging carburetor of claim 21, wherein an axis of rotation of a support shaft of the butterfly valve is parallel with an axis of rotation of a support shaft of the scavenging plug valve.

23. The scavenging carburetor of claim 21, wherein the scavenging plug valve is adapted to start opening the air passage when the scavenging plug valve has rotated by more than a prescribed angle from a fully closed position.

24. The scavenging carburetor of claim 23, wherein the scavenging plug valve includes a bore therethrough that is smaller in size than the scavenging air passage.

25. The scavenging carburetor of claim 24, wherein the synchronizing mechanism includes a lost motion mechanism.

26. The scavenging carburetor of claim 21, wherein the synchronizing mechanism includes levers attached to shafts of the valves and the levers are connected to each other by a connecting rod.

* * * * *